(12) United States Patent
Nakagome

(10) Patent No.: US 7,784,958 B2
(45) Date of Patent: Aug. 31, 2010

(54) LENS SHEET, OPTICAL SHEET, AND BACKLIGHT UNIT AND DISPLAY APPARATUS PROVIDED THEREWITH

(75) Inventor: Tomohiro Nakagome, Tokyo (JP)

(73) Assignee: Toppan Printing Co., Ltd. (JP)

( * ) Notice: Subject to any disclaimer, the term of this patent is extended or adjusted under 35 U.S.C. 154(b) by 0 days.

(21) Appl. No.: 12/631,677

(22) Filed: Dec. 4, 2009

(65) Prior Publication Data

US 2010/0118516 A1    May 13, 2010

Related U.S. Application Data

(63) Continuation of application No. PCT/JP2008/063832, filed on Aug. 1, 2008.

(30) Foreign Application Priority Data

May 13, 2008   (JP)   .............................. 2008-125670
Aug. 1, 2008    (JP)   .............................. 2009-526967

(51) Int. Cl.
*G09F 13/04*    (2006.01)

(52) U.S. Cl. ........................ 362/97.2; 362/337; 349/62

(58) Field of Classification Search ................ 362/97.1, 362/97.2, 97.3, 97.4, 308, 309, 326, 328, 362/330, 332, 336, 337, 339, 561, 606–608, 362/611–614; 349/57, 61, 62, 65, 69, 70
See application file for complete search history.

(56) References Cited

U.S. PATENT DOCUMENTS 7,009,340 B2 *   3/2006   Asai et al. .................... 313/512
7,458,704 B2 *  12/2008   Naoi .......................... 362/330

FOREIGN PATENT DOCUMENTS

| JP | 06-308485 | 11/1994 |
| JP | 09-021907 | 1/1997 |
| JP | 2008-020532 | 1/2008 |
| WO | WO 2006/055112 | 5/2006 |
| WO | WO 2007/032469 | 3/2007 |

* cited by examiner

*Primary Examiner*—Hargobind S Sawhney
(74) *Attorney, Agent, or Firm*—Squire, Sanders & Dempsey L.L.P.

(57) ABSTRACT

The invention provides a novel lens sheet that can control a visual field range with high brightness while reducing side lobe generated in a conventional prism sheet, a low-profile, high-strength, high-display-quality optical sheet in which the lens sheet and a diffuser plate are optically integrated, and a backlight unit and display apparatus, in which the optical sheet is used.

8 Claims, 21 Drawing Sheets

(a)

(b)

(a)

(b)

LENS SHEET, OPTICAL SHEET, AND BACKLIGHT UNIT AND DISPLAY APPARATUS PROVIDED THEREWITH

This application is a continuation of International Application No. PCT/JP2008/063832, filed Aug. 1, 2008, which is incorporated herein by reference in its entirety.

TECHNICAL FIELD

The present invention relates to a lens sheet, an optical sheet, a backlight unit, and a display apparatus, which are used to control a lighting optical path. Particularly the invention relates to the lens sheet, optical sheet, backlight unit, and display apparatus, which are used to control the lighting optical path in an image display apparatus typified by a flat panel display.

BACKGROUND ART

Recently a directly type backlight in which a plurality of cold-cathode tubes or LEDs (Light Emitting Diodes) are disposed is used to illuminate a large-size liquid crystal display television.

A diffuser plate having a strong light scattering property is used between an image display element and a light source such that the cold-cathode tube or LED is not visually recognized as the light source.

Because the diffuser plate diffuses light toward all directions by the light diffusion effect, the diffuser plate darkens the liquid crystal display apparatus. Usually a thickness of about 1 to 5 mm is necessary for the diffuser plate in order to enhance the light scattering property and to support an optical film adjoined on the diffuser plate. Therefore, a large amount of light is absorbed by the diffuser plate that darkens the liquid crystal screen display.

Conventionally, the diffuser plate used in the directly beneath type backlight is intended to diffuse the light emitted from the cold-cathode tube that is the light source to reduce brightness unevenness (lamp image). Accordingly, usually single or plural optical films are disposed on the diffuser plate in order to enhance the brightness in an observer-side direction.

Brightness Enhancement Film (BEF) (registered trademark, product of 3M in US) is widely used as the lens sheet in order to enhance the brightness of the liquid crystal display screen.

FIG. 14 is a sectional view schematically illustrating an example of disposition of a BEF, and FIG. 15 is a perspective view of the BEF. As illustrated in FIGS. 14 and 15, a BEF 185 is an optical film in which unit prisms 187 having triangular shapes in section are unidirectionally and periodically arrayed on a member 186. The unit prism 187 has a pitch larger than a wavelength of the light.

The BEF 185 collects the "off-axis" light, and redirects the light "on-axis" or recycles the light toward a viewer. That is, the BEF 185 can reduce the off-axis brightness to enhance the on-axis brightness during the use of the display (observation). As used herein, "on-axis" means a direction that is matched with a visual field direction F' of the viewer, and usually "on-axis" is located on the side of the direction normal to a display screen.

In the use of the lens sheet typified by the BEF 185, a diffusion film (hereinafter referred to as lower diffusion film) in which a diffusion filler is applied onto a transparent base material to impart functions of diffusing and collecting the light is disposed between the diffuser plate and the lens sheet.

Therefore, not only can the diffusion light output from the diffuser plate efficiently be collected, but also visibility of the light source, which is hardly eliminated only by the diffuser plate, can be suppressed.

When the light diffusion film is disposed between the lens sheet and the liquid crystal panel, not only can the side lobe be reduced, but also a moire interference fringe generated between the regularly-arrayed lenses and liquid crystal pixels can be prevented.

A display designer can use the BEF to achieve the desired on-axis brightness while reducing power consumption.

For example, Patent Documents 1 to 3 disclose a technique in which a brightness control member having a repetitive array structure of the prism typified by BEF is used in the display. In the optical sheet in which BEF is used as the brightness control member, the light emitted from the light source is finally output at a controlled angle from the film by refraction, so that the control can be performed so as to enhance the light intensity in a visual direction of the viewer.

[Patent Document 1] Japanese Patent Application Publication No. 1-37801

[Patent Document 2] Japanese Patent Application Laid-Open No. 6-102506

[Patent Document 3] Japanese PCT National Publication No. 10-506500

However, in the use of the BEF 185, sometimes a light component is vainly output in a lateral direction without going in the visual direction F' of the viewer by reflection/refraction.

A line B of FIG. 16 expresses a characteristic of the BEF 185. In the line B, the light intensity is maximized at an angle of 0° (corresponding to the on-axis direction) with respect to the visual direction F', and small light intensity peaks (side lobe) are generated near angles of ±90° with respect to the visual direction F' to increase the light vainly output in the lateral direction.

The brightness distribution having such light intensity peaks is undesirable, and a smooth brightness distribution expressed by a line A of FIG. 16 is desirable, in which there is no light intensity peak near the angles of ±90°.

When only the on-axis brightness is excessively enhanced, a peak width of the brightness distribution curve is remarkably narrowed to extremely restrict a visual region. In order to properly spread the peak width, it is necessary to additionally use a light diffusion film that is different from the prism sheet, which causes a problem in that the number of members is increased.

There are strong market needs for the light weight, low power consumption, high brightness, and low profile in the liquid crystal display apparatus, and therefore the light weight, low power consumption, and high brightness are necessary for the backlight unit mounted on the liquid crystal display apparatus.

Particularly, in the color liquid crystal display apparatus continuing the remarkable development in recent years, because transmissivity of the liquid crystal panel is much lower than that of the monochrome liquid crystal panel, it is necessary to enhance the brightness of the backlight unit in order to achieve the low power consumption of the color liquid crystal display apparatus.

However, as described above, the conventional apparatus responds insufficiently to the needs for high brightness and low power consumption. Therefore, users still desire a backlight unit and display apparatus, which can implement the liquid crystal display apparatus of low cost, high brightness, high-quality display, and low power consumption.

SUMMARY OF THE INVENTION

The present invention has been made in view of the foregoing, and an object of the invention is to provide a novel lens sheet that enhances the brightness on the observer side by efficiently collecting the diffusion light output from the diffuser plate while the side lobe is hardly generated, and an optical sheet, a backlight unit, and a display apparatus, which are provided with the lens sheet.

One embodiment of the present invention is a lens sheet, wherein a trapezoidal prism array that is a first lens array is disposed on one of surfaces of a light transmissive base material with an apex angle of the trapezoidal prism array that ranges from 70 degrees to 110 degrees, a triangular prism array that is a second lens array is disposed within an intersection angle range of 70 degrees to 110 degrees in an apex portion of the trapezoidal prism array with an apex angle of the triangular prism array that ranges from 70 degrees to 110 degrees, a lens height of the triangular prism array is lower than a lens height of the trapezoidal prism array, and the apex portion of the trapezoidal prism array is flush with an apex portion of the triangular prism array.

Figure 1:
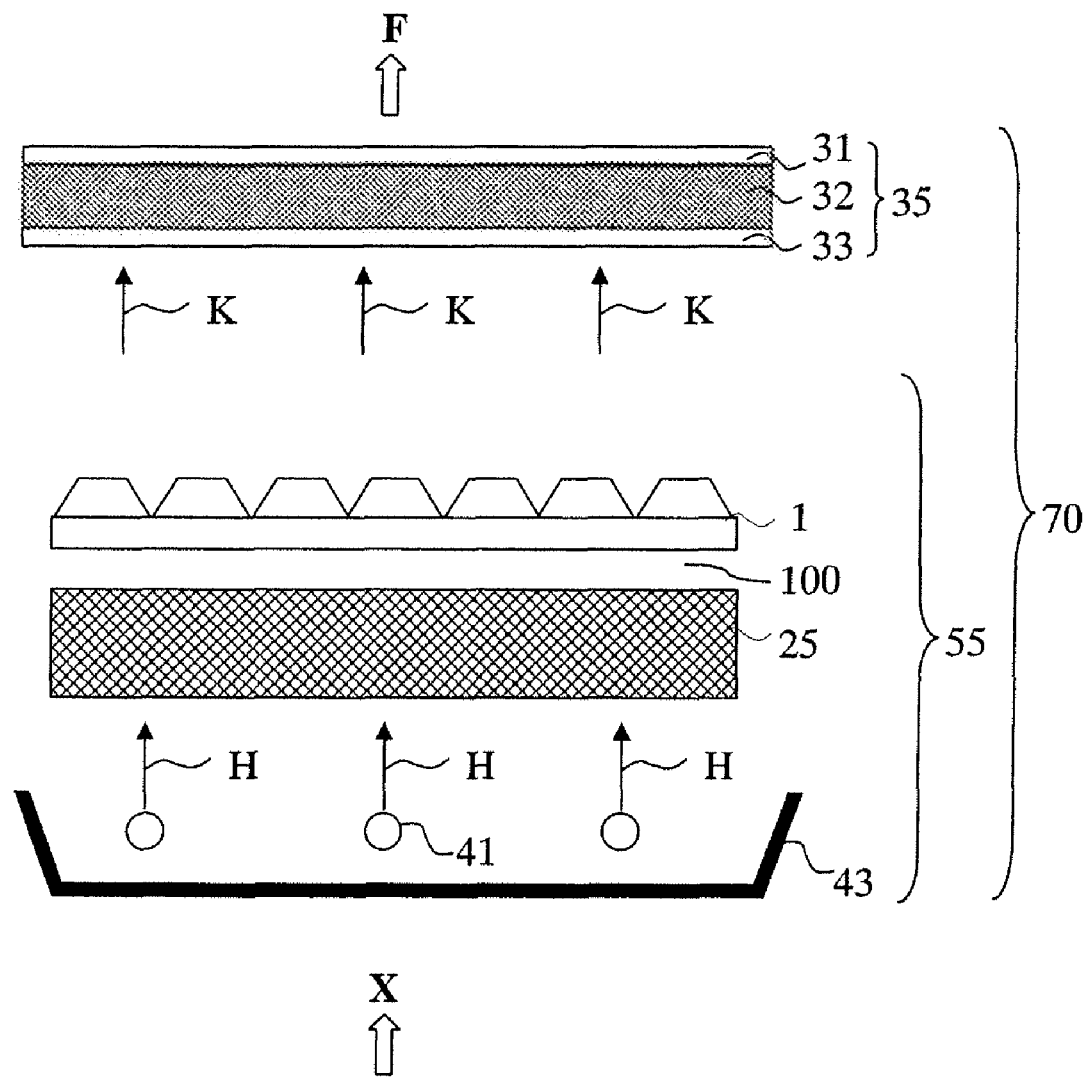
FIG. 1 is a sectional view schematically illustrating a display apparatus according to a first embodiment of the invention.

Table 1 illustrates comparison of Examples 1 to 3 and Comparative Example 1.

EXPLANATION OF REFERENCE NUMERALS

A: Light intensity distribution of BEF
B: Light intensity distribution of optical film
H, K: Light
L: Width of apex portion of first lens array
P: Pitch of first lens array
Q: Pitch of second lens array
F, F': Observer side
X: Plan view direction
Va: Valley of light distribution property
Ve: Vertical direction of image display apparatus
Ho: Horizontal direction of image display apparatus
α: Maximum inclination ratio
1: Lens sheet
2: Lens sheet
3: First lens array
3a: Apex portion of first lens array
3b: Inclined surface of first lens array
4: First lens array mold portion
5: Second lens array
5a: Apex portion of second lens array
6: Second lens array mold portion
17: Light transmissive base material
17a: Opposite surface of observer
17b: Surface on observer side
20: Fixed layer
25: Diffuser plate
29: Protrusion
31, 33: Polarizing plate
32: Liquid crystal panel
35: Image display element
41: Light source
43: Reflection plate (reflection film)
52: Optical sheet
55: Backlight unit
70: Display apparatus
100: Air layer
102: Plane surface portion 182: Diffusion film
184: Optical diffusion film
185: BEF
186: Transparent member
187: Unit prism

BEST MODE FOR CARRYING OUT THE
INVENTION

Embodiments of the invention will be described below.

FIG. 1 is a sectional view schematically illustrating examples of a lens sheet, a backlight unit, and a display apparatus according to a first embodiment of the invention.

A display apparatus 70 of the first embodiment includes an image display element 35 and a backlight unit 55. In the backlight unit 55 of the first embodiment, plural light sources 41 are disposed in a lamp housing (reflection plate) 43, a diffuser plate 25 that outputs light incident from the light source 41 while diffusing the light is disposed on the light sources 41 (in an observer-side direction F), and a lens sheet 1 of the first embodiment is disposed on the diffuser plate 25. Between the diffuser plate 25 and the lens sheet 1 there is a gap (air gap) 100 in between.

The diffuser plate 25 diffuses light H emitted from the light source 41, the lens sheet 1 disposed on the diffuser plate 25 collects the light H, light K emitted from the backlight unit 55 is incident to the image display element 35 and output onto an observer side F.

The light source 41 supplies the light to the image display element 35. For example, plural linear light sources and point light sources can be used as the light sources 41. For example, plural lamp light sources such as fluorescent lamps, cold-cathode tubes (CCFL), and EEFLs can be used as the plural linear light sources. For example, LEDs can be used as the plural point light sources.

The reflection plate 43 is disposed opposite the observer side F of the plural light sources 41, and reflects the light output in the direction opposite to the observer side F and outputs the light onto the observer side F in the light output in the whole direction from the light source 41. As a result, the light H output onto the observer side F substantially becomes the light output in the whole direction from the light source 41. Therefore, the light usage efficiency can be enhanced with the reflection plate 43. Any member may be used as the reflection plate 43 as long as the member reflects the light with high efficiency. For example, a general reflection film and a general reflection plate can be used as the reflection plate 43.

The lens sheet 1 of the first embodiment will be described with reference to FIG. 2. A first lens array 3 is formed on a surface 17b on the observer side F of a light transmissive base material 17. In an apex portion 3a of the first lens array 3, a second lens array 5 is formed in a direction intersecting an array direction of the first lens array 3.

Desirably the second lens array 5 has a triangular prism shape. This is attributed to the fact that the high-brightness display apparatus 70 can be obtained because the triangular prism shape has a high effect of collecting the light onto the observer side F. In order to obtain the high-brightness display apparatus 70, desirably an apex angle θ2 of the triangular prism ranges from 70 degrees to 110 degrees, and more desirably from 80 degrees to 100 degrees. The side lobe increases to lower the brightness when the apex angle θ2 is smaller than 70 degrees, and the half-value angle spreads to lower the brightness when the apex angle θ2 is more than 110 degrees.

Desirably the first lens array 3 has a trapezoidal prism shape. The second lens array 5 is formed in the apex portion 3a of the trapezoidal prism. The trapezoidal prism obtains the light collecting effect similar to that of the triangular prism because an inclined surface 3b becomes a substantially straight line. Therefore, the trapezoidal prism has the high effect of collecting light onto the observer side F, so that the high-brightness display apparatus 70 can be obtained. In order to obtain the high-brightness display apparatus 70, desirably an apex angle θ1 of the trapezoidal prism ranges from 70 degrees to 110 degrees, and more desirably from 80 degrees to 100 degrees. The side lobe increases to lower the brightness when the apex angle θ1 is smaller than 70 degrees, and the half-value angle spreads to lower the brightness when the apex angle θ1 is more than 110 degrees.

Figure 2:
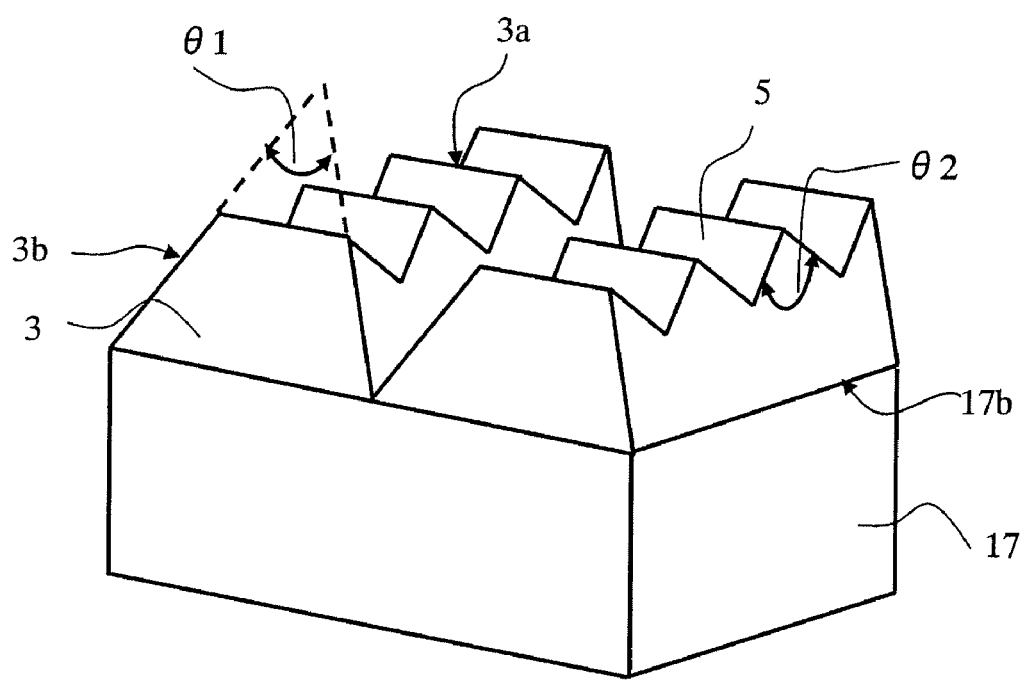
FIG. 2 is a perspective view illustrating a lens sheet of the first embodiment.

FIG. 2 is a perspective view illustrating the lens sheet when the first lens array 3 is formed into the trapezoidal prism shape while the second lens array 5 is formed into the triangular prism shape.

Figure 3:
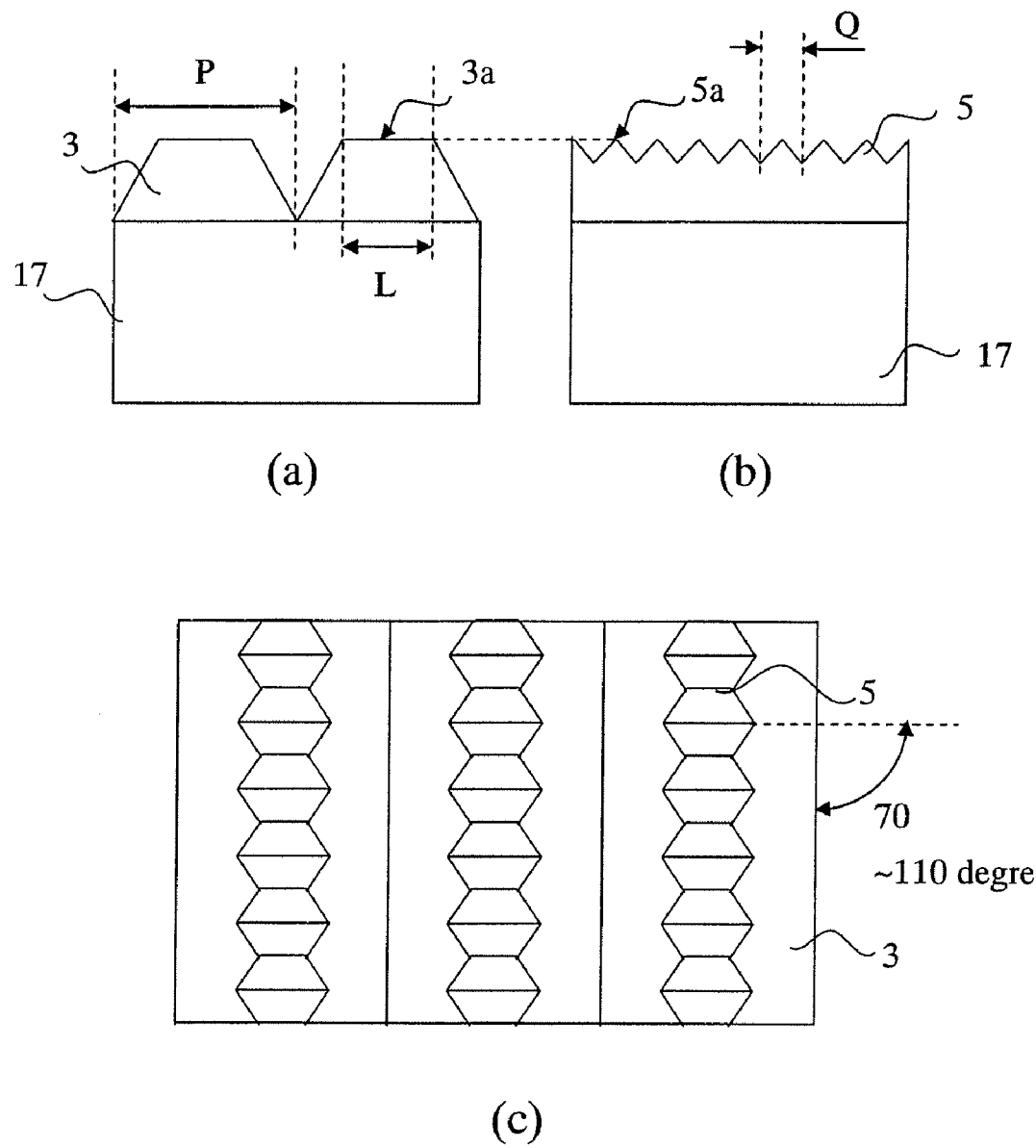
FIG. 3A is a sectional view illustrating the lens sheet of the first embodiment.
FIG. 3B is a sectional view illustrating the lens sheet of the first embodiment.
FIG. 3C is a plan view illustrating the lens sheet of the first embodiment.

The triangular prism is formed in a short side portion (apex portion 3a) of the trapezoidal prism. When the lenses are unidirectionally formed in the lens sheet, the light collecting effect is obtained only on the lens array direction side. Accordingly, there are a direction of a narrow visual field and a direction of a broad visual field. FIG. 3A illustrates the lens sheet 1 from the direction in which the sectional shape of the first lens array 3 can be viewed from the side, and FIG. 3B illustrates the lens sheet 1 from the direction in which the sectional shape of the second lens array 5 can be viewed from the side. The apex portion 5a of the second lens array 5 is flush with the apex portion 3a of the trapezoidal prism that is the first lens array 3.

As illustrated in FIG. 3C, desirably an angle formed by the first lens array 3 and the second lens array 5 ranges from 70 degrees to 110 degrees. When the two lens sheets 1 are used while overlapped with each other, a moire interference fringe generated by overlapping the first lens array 3 of one of the lens sheets 1 and the second lens array 5 of the other lens sheet 1 can be suppressed. When the angle is smaller than 70 degrees or more than 110 degrees, a strain is generated in a light distribution of the lens sheet 1 and the observer can recognize the strain, which is not preferable.

Desirably the angle formed by the first lens array 3 and the second lens array 5 is about 90 degrees. This is because, the light collecting effect is obtained at the angle of about 90 degrees in both a horizontal direction Ho and a vertical direction Ve when the display apparatus 70 is viewed from the observer side F.

In the lens sheet 1 of the first embodiment, the light collecting effect is enhanced because the light collecting function exists in the two directions. A polygonal pyramid lens typified by a quadrilateral pyramid can be cited as an example of the optical film in which the light collecting function exists in at least two directions. However, in the polygonal pyramid lens, it is necessary to change an apex angle thereof in order to adjust a light collecting ratio in the two directions. For example, in the quadrilateral pyramid, the brightness becomes the maximum at the apex angle of 90 degrees. When the visual field range is spread in one of the directions, or when the visual field range is narrowed in one of the directions, it is necessary to increase or decrease the apex angle. However, the change in apex angle causes a problem in that the brightness is lowered. On the other hand, in the lens sheet 1 of the first embodiment, the first lens array 3 has the trapezoidal prism shape, the second lens array 5 has the triangular prism shape, and the apex portion 3a of the trapezoidal prism that is the first lens array 3 is flush with the apex portion 5a of the second lens array 5. Therefore, the light collecting ratio in the two directions can be adjusted without largely changing the brightness by changing a width of the apex portion 3a of the first lens array 3. That is, the visual field range can arbitrarily be set by application conditions of the lens sheet 1, such that the visual field is widely set in the direction Ho, or such that the visual fields are substantially equally set in the direction Ho and the direction Ve.

Figure 4A:
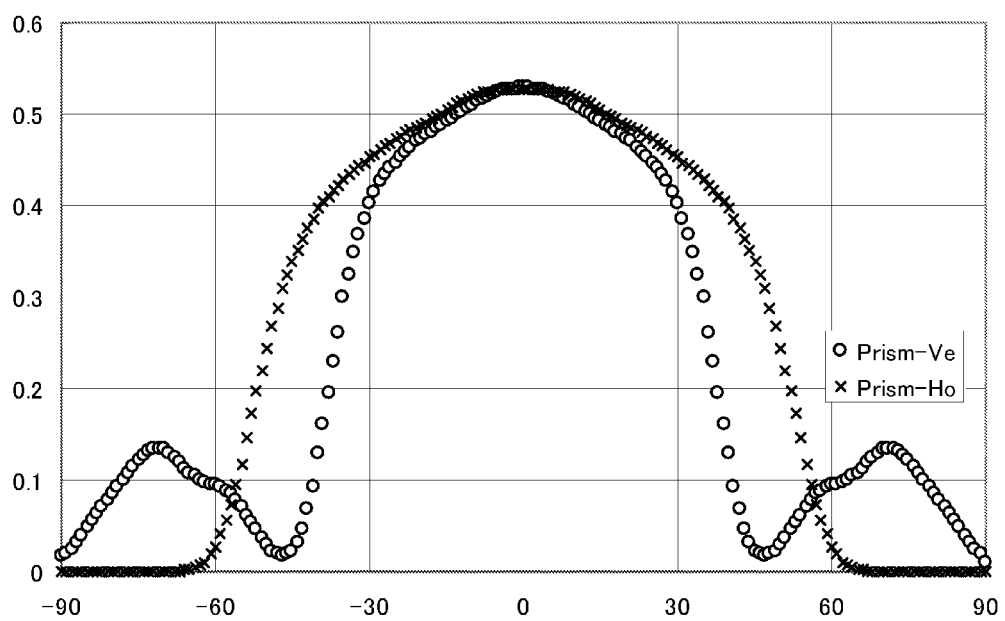
FIG. 4A illustrates a light distribution property of a conventional prism.

In the lens sheet 1 of the first embodiment, the first lens array 3 has the trapezoidal prism shape, and the second lens array 5 has the triangular prism shape. Therefore, the side lobe generated in the triangular prism is hardly generated. FIG. 4A illustrates a view angle distribution of the 90-degree triangular prism. The triangular prism has the maximum peak at 0 degree because the triangular prism collects the light in the front direction. However, the side lobe is generated to form a valley Va near 45 degrees. Although the side lobe is the outgoing light in the unnecessary direction for the display apparatus 70, the side lobe does not become troublesome in observing the display apparatus 70, but the low brightness in the valley Va between the main peak at 0 degree and the side lobe becomes troublesome. The screen darkens when the display apparatus 70 is observed from the angle of the valley Va. Accordingly, the excessively low brightness of the valley Va is undesirable for the display apparatus 70 even if the side lobe decreases.

Figure 4B:
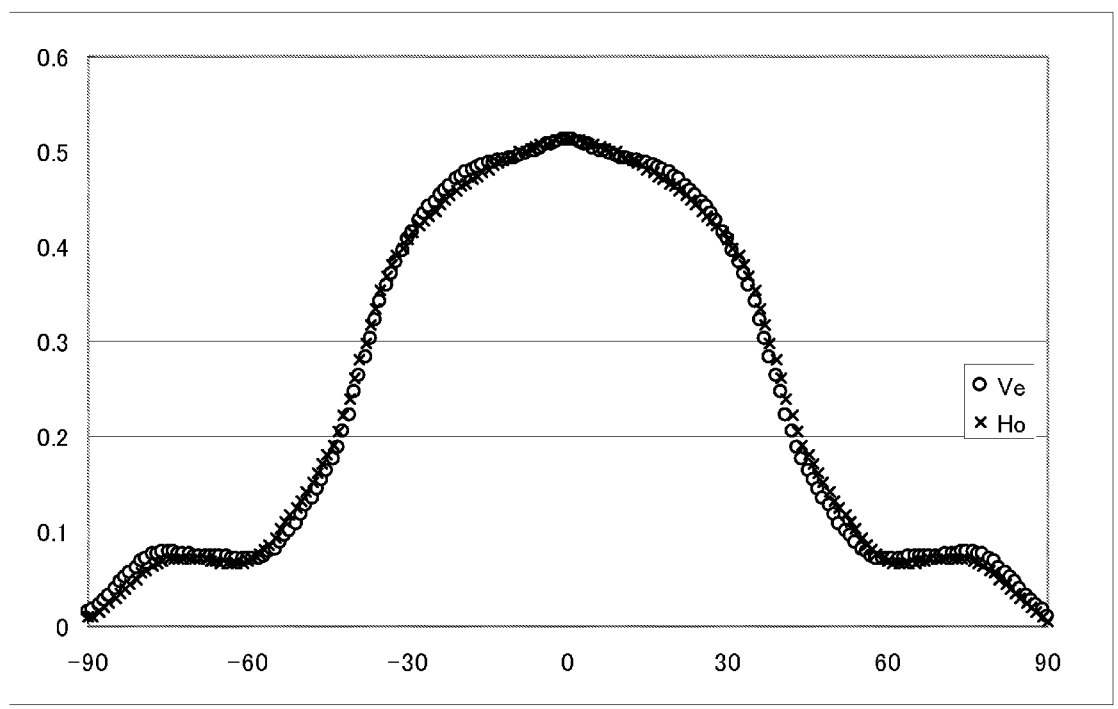
FIG. 4B illustrates a light distribution property of the lens sheet of the first embodiment.

The lens sheet 1 of the first embodiment has a combined shape in which the first lens array 3 has the trapezoidal prism shape while the second lens array 5 has the triangular prism shape, so that the lens sheet 1 can output the light to the valley Va as illustrated in FIG. 4B. That is, the lens sheet 1 has a visual field distribution property in which the visual field distribution in the direction Ve and the visual field distribution in the direction Ho of the 90-degree triangular prism of FIG. 4A are combined. The visual field can be spread in the direction Ve or the direction Ho by adjusting the width of the apex portion 3a of the first lens array 3.

Figure 5A:
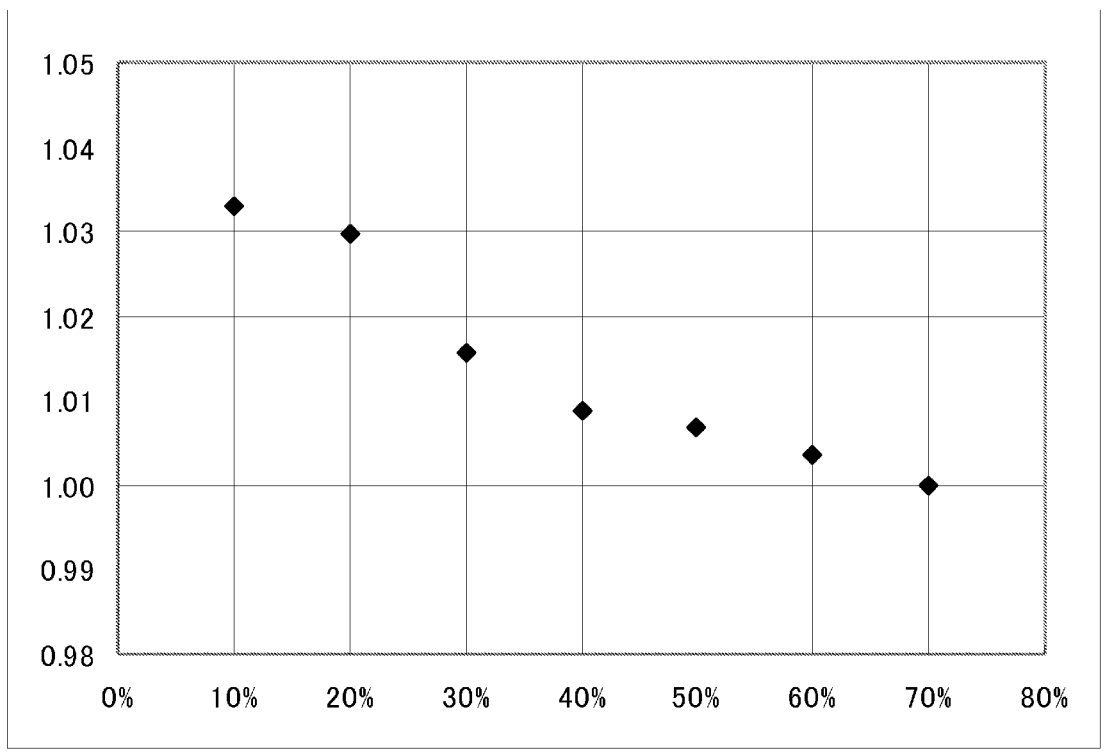
FIG. 5A illustrates a brightness change of the lens sheet of the first embodiment.
Figure 5B:
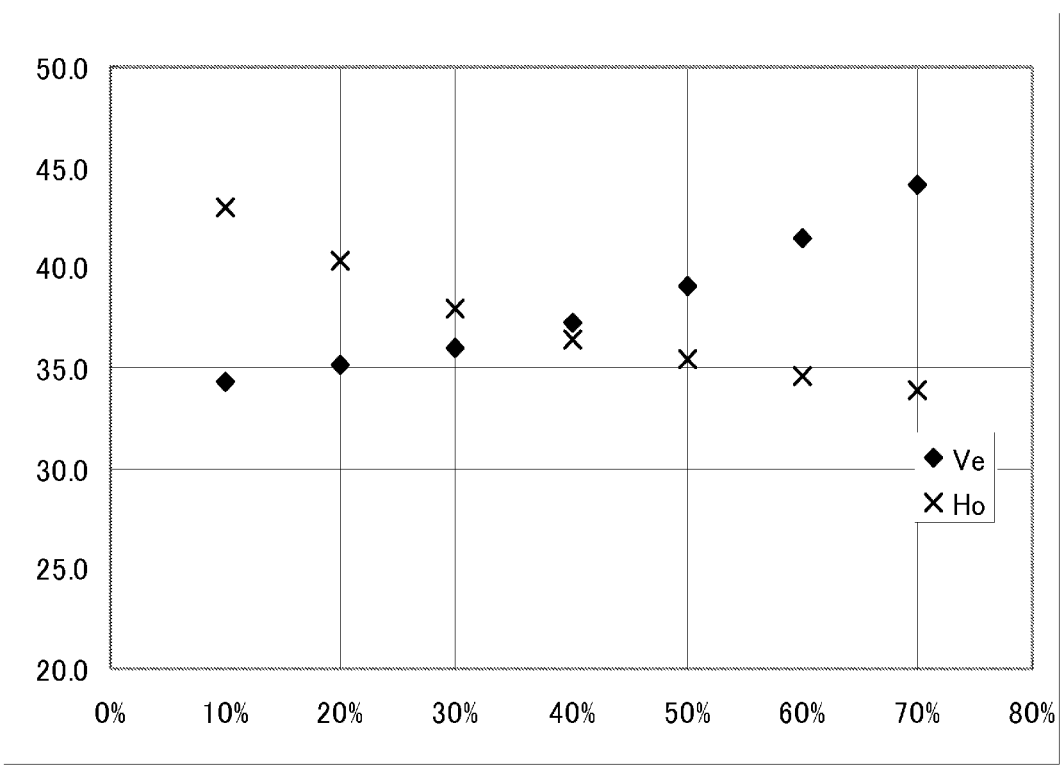
FIG. 5B illustrates a half-value angle change of the lens sheet of the first embodiment.

FIG. 5A illustrates the brightness of the lens sheet 1 of the first embodiment when the width L is changed in the apex portion 3a of the first lens array 3, and FIG. 5B illustrates half-value angles in the direction Ve and the direction Ho. The brightness is illustrated while the brightness of the 90-degree triangular prism is set to 1.0. As used herein, the half-value angle means a view angle at which the brightness becomes 50% when the brightness in the 0-degree direction (observer side F) is set to 100%. In this measurement, the display apparatus 70 is disposed such that the array direction of the first lens array 3 becomes the direction Ve while the array direction of the second lens array 5 becomes the direction Ho. The x-axis of FIG. 4 indicates a ratio of the width L of the apex portion 3a of the first lens array 3 and a pitch P between unit lenses constituting the first lens array 3.

When the width L of the apex portion 3a of the first lens array 3 is decreased, because the light collecting effect of the second lens array 5 is weakened while the light collecting effect of the first lens array 3 is strengthened, the half-value angle in the direction Ve is narrowed while the half-value angle in the direction Ho is spread. On the contrary, when the width of the apex portion 3a of the first lens array 3 is increased, because the light collecting effect of the first lens array 3 is weakened while the light collecting effect of the second lens array 5 is strengthened, the half-value angle in the direction Ve is spread while the half-value angle in the direction Ho is narrowed.

When the display apparatus 70 of the first embodiment is used in a television set, it is desirable to spread the half-value angle in the direction Ho. This is because, in viewing the television, the observer views the television from various positions in the direction Ho. On the other hand, when the display apparatus 70 of the first embodiment is used in an advertising billboard, it is desirable to spread the half-value angle in the direction Ve.

In the lens sheet 1 of the first embodiment, the first lens array 3 may be arrayed in the direction Ve, or may be arrayed in the direction Ho. This is because, as described above, the half-value angles in the direction Ve and the direction Ho can be controlled by changing the width L of the apex portion 3a of the first lens array 3. Accordingly, the ratio of the width L of the apex portion 3a of the first lens array 3 and the pitch P between the unit lenses constituting the first lens array 3 can arbitrarily be selected.

Assuming that Q is a pitch between unit lenses constituting the second lens array 5, $0.05 \leq Q/P \leq 2.0$ is desirable. The second lens array 5 of the lens sheet 1 of the first embodiment is formed in the apex portion 3a of the first lens array 3. The lens shape of the first lens array 3 is the trapezoidal prism, and the lens shape of the second lens array 5 is the triangular prism. Because the apex angle has the optimum range of 70 degrees to 110 degrees, the first lens array 3 having the apex angle of 70 degrees is formed in the trapezoidal prism, and the second lens array 5 having the apex angle of 110 degrees is formed in the triangular prism. When the pitch Q between the unit lenses constituting the second lens array 5 exceeds double the pitch P between the unit lenses constituting the first lens array 3, the unit lenses constituting the second lens array 5 become higher than the unit lenses constituting the first lens array 3 to eliminate the effect of the first lens array 3. Accordingly, it is desirable that Q/P is 2 or less. When the pitch Q between the unit lenses constituting the second lens array 5 is smaller than the pitch P between the unit lenses constituting the first lens array 3, no trouble is generated in the brightness and the half-value angle. For example, it is assumed that the pitch Q between the unit lenses constituting the second lens array 5 is set to 20 μm. When Q/P is 0.05, the pitch P between the unit lenses constituting the first lens array 3 becomes 400 μm. When the pitch P between the unit lenses constituting the first lens array 3 becomes excessively large, undesirably the moire interference fringe is easily generated between the periodical structure of the image display element 35 and the periodical structure of the first lens array 3. On the other hand, when the pitch P between the unit lenses constituting the first lens array 3 is decreased, undesirably the pitch Q between the unit lenses constituting the second lens array 5 becomes excessively small. Accordingly, it is desirable that Q/P is 0.05 or more.

The lens shapes of the first lens array 3 and second lens array 5 constituting the lens sheet 1 of the first embodiment will be described in detail.

Assuming that the array direction of the first lens array 3 of the lens sheet 1 is set to the horizontal direction Ho when the display apparatus 70 is viewed from the observer side F, desirably Formula 1 is satisfied:

$$\theta 1 \leq \theta 2 \qquad \text{[Formula 3]}$$

where θ1 is an apex angle of the trapezoidal prism of the first lens array 3 and θ2 is an apex angle of the triangular prism of the second lens array 5.

Particularly 80 degrees $\leq \theta 1 \leq$ 90 degrees is desirable when the triangular prism of the second lens array 5 has the apex angle of 90 degrees.

Formula 3 will be described with reference to FIG. 6.

Figure 6A:
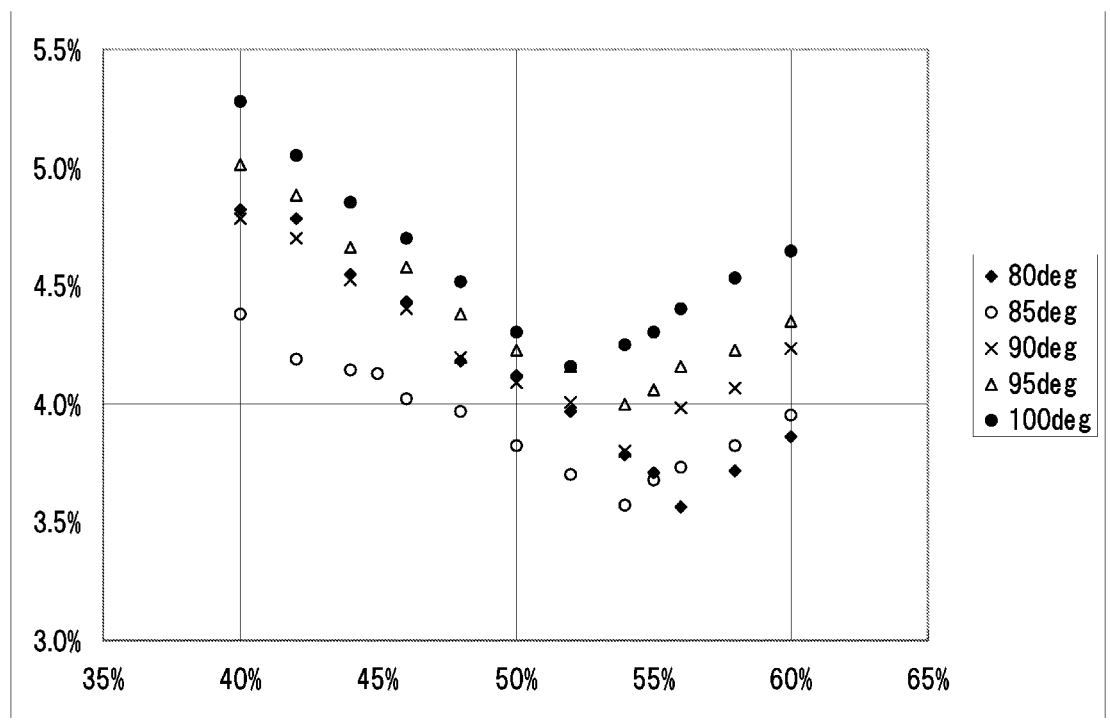
FIG. 6A illustrates a maximum inclination ratio α(Ve) of the lens sheet of the first embodiment.
Figure 6B:
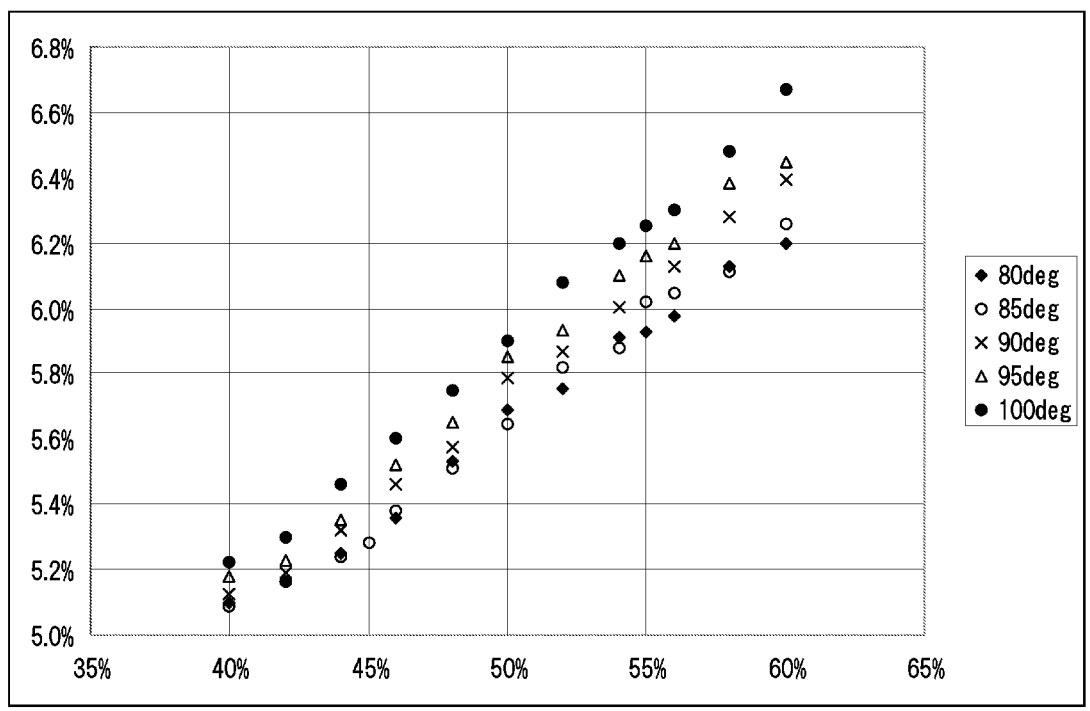
FIG. 6B illustrates a maximum inclination ratio α(Ho) of the lens sheet of the first embodiment.

FIG. 6A is a graph illustrating a maximum inclination ratio in the direction Ve of the lens sheet 1 of the first embodiment, and FIG. 6B is a graph illustrating a maximum inclination ratio in the direction Ho. In FIG. 6, the apex angle θ1 of the first lens array 3 is changed from 80 degrees to 90 degrees, and the apex angle θ2 of the second lens array 5 is maintained at 90 degrees.

The maximum inclination ratio is defined as follows. Assuming that an XY-plane is an outgoing surface of the optical sheet and a Z-axis is a front direction of the outgoing surface, a maximum inclination ratio α(a) at θ=a° is defined as follows:

$$\alpha(a) = \text{MAX}[\{L(a,0) - L(a,1)\}/L(a,0), \{L(a,1) - L(a,2)\}/L(a,0), \{L(a,2) - L(a,3)\}/L(a,0), \ldots \{L(a,n) - L(a,n-1)\}/L(a,0), \ldots \{L(a,88) - L(a,89)\}/L(a,0), \{L(a,89) - L(a,90)\}/L(a,0)]$$

where $L(\theta,\phi)$ is an outgoing light at a spherical coordinate $(\theta,\phi)$ about the Z-axis.

That is, the maximum inclination ratio α expresses how much the brightness is changed when a view angle is changed by 1 degree. The brightness change caused by the view angle change is increased (cut-off is generated) as the maximum inclination ratio α is increased.

The half-value angle of FIG. 5A is obtained in setting the array direction of the first lens array to the vertical direction Ve when the display apparatus 70 is viewed from the observer side F. Therefore, the half-value angles in the direction Ve and direction Ho of FIG. 5B are reversed when the array direction of the first lens array of the lens sheet 1 is set to the horizontal direction Ho.

In the display apparatus 70, desirably the half-value angle in the horizontal direction Ho is generally wider than the half-value angle in the vertical direction Ve, and the horizontal direction Ho is lower than the vertical direction Ve in the maximum inclination ratio α.

Accordingly, when the array direction of the first lens array of the lens sheet 1 is set to the horizontal direction Ho, preferably the ratio of the width L of the apex portion 3a of the first lens array 3 and the pitch between the unit lenses constituting the first lens array 3 is not lower than 40%.

When the ratio of the width L of the apex portion 3a of the first lens array 3 and the pitch between the unit lenses constituting the first lens array 3 ranges from 40% to 55%, a trade-off relationship is established between the maximum inclination ratios α in the direction Ve and direction Ho. Accordingly, the maximum inclination ratio α in the direction Ho is desirably decreased. However, the maximum inclination ratio α in the direction Ve is increased when the maximum inclination ratio α in the direction Ho is excessively decreased.

Therefore, when the apex angle θ1 of the first lens array 3 is set smaller than 90 degrees, the maximum inclination ratio α in the direction Ho can be decreased without increasing the maximum inclination ratio α in the direction Ve compared with the apex angle θ1 of 90 degrees. However, when the apex angle θ1 is excessively decreased, the maximum inclination ratio α in the direction Ho is increased again, and the brightness is lowered. Therefore, desirably the apex angle θ1 of the first lens array 3 exceeds 80 degrees, and most preferably the apex angle θ1 is 85 degrees.

Assuming that the array direction of the first lens array 3 of the lens sheet 1 is set to the vertical direction Ve when the display apparatus 70 is viewed from the observer side F, desirably Formula 4 is satisfied:

$$\theta 1 \geqq \theta 2 \qquad \text{[Formula 4]}$$

where θ1 is an apex angle of the trapezoidal prism of the first lens array 3 and θ2 is an apex angle of the triangular prism of the second lens array 5.

Particularly 80 degrees≦θ2≦90 degrees is desirable when the triangular prism of the first lens array 3 has the apex angle of 90 degrees.

Figure 7A:
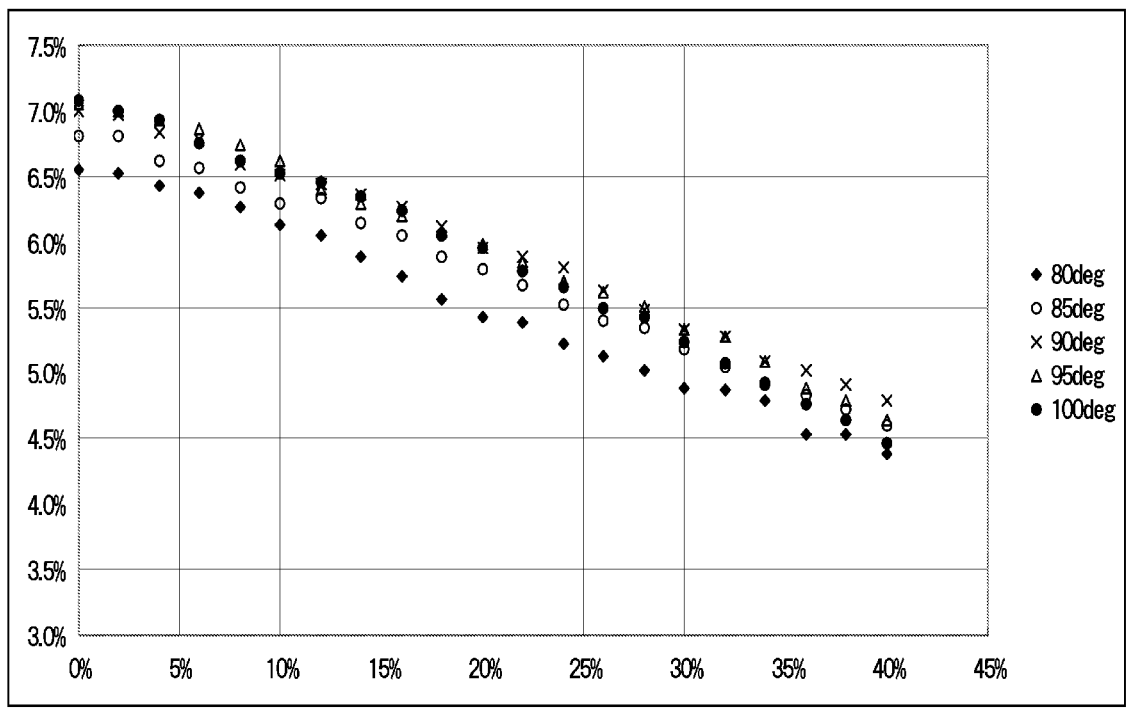
FIG. 7A illustrates a maximum inclination ratio α(Ve) of the lens sheet of the first embodiment.
Figure 7B:
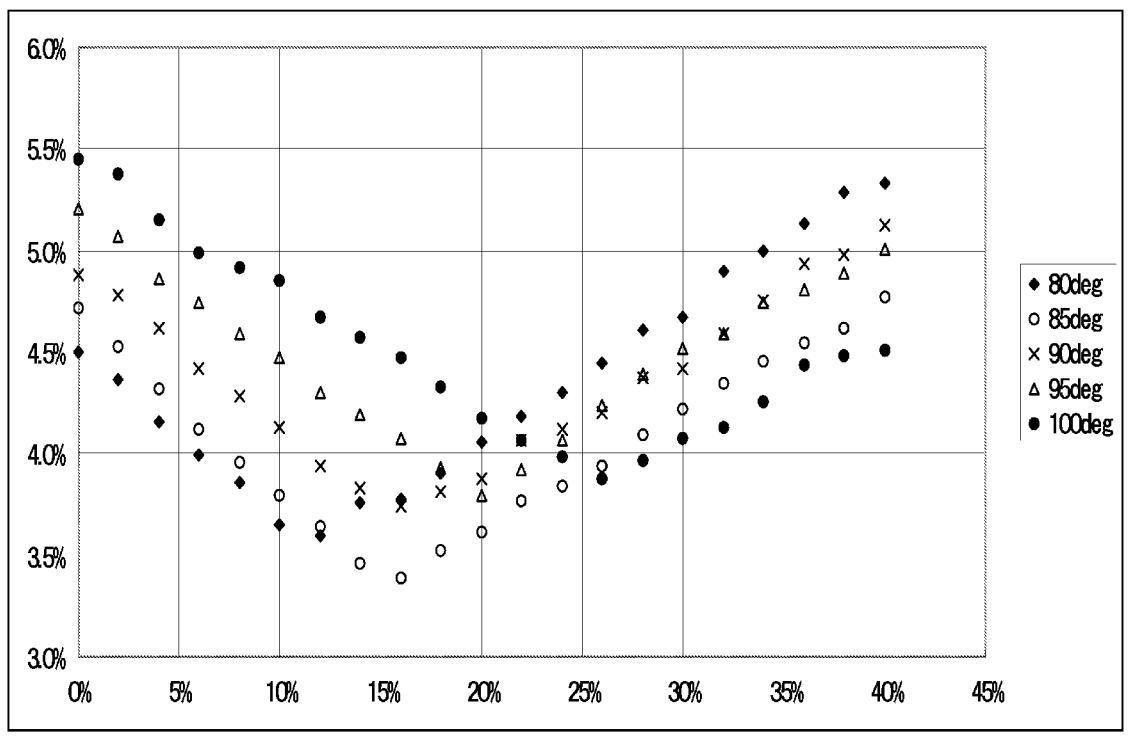
FIG. 7B illustrates a maximum inclination ratio α(Ho) of the lens sheet of the first embodiment.

FIGS. 7A and 7B illustrate maximum inclination ratios α in the direction Ve and direction Ho, respectively, assuming that the array direction of the first lens array is set to the vertical direction Ve when the display apparatus 70 is viewed from the observer side F. At this point, an influence of the apex angle θ2 of the second lens array 5 is confirmed while the apex angle θ1 of the first lens array 3 is fixed to 90 degrees.

When the array direction of the first lens array is set to the vertical direction Ve, the half-value angle is as illustrated in FIG. 5B, and desirably the ratio of the width L of the apex portion 3a of the first lens array 3 and the pitch between the unit lenses constituting the first lens array 3 is 40% or less. This is because the half-value angle is spread in the direction Ho.

When the ratio of the width L of the apex portion 3a of the first lens array 3 and the pitch between the unit lenses is 20% or less, and when the apex angle θ2 of the second lens array 5 is lower than 90 degrees, the maximum inclination ratio α in the direction Ho can be decreased without changing the maximum inclination ratio α in the direction Ve. On the other hand, when the ratio of the width L of the apex portion 3a of the first lens array 3 and the pitch between the unit lenses is not lower than 20%, and when the apex angle θ2 is 90 degrees or less, the maximum inclination ratio α in the direction Ho is increased. When the apex angle θ2 exceeds 90 degrees, the maximum inclination ratio α in the direction Ho can be decreased without changing the maximum inclination ratio α in the direction Ve.

Figure 8:
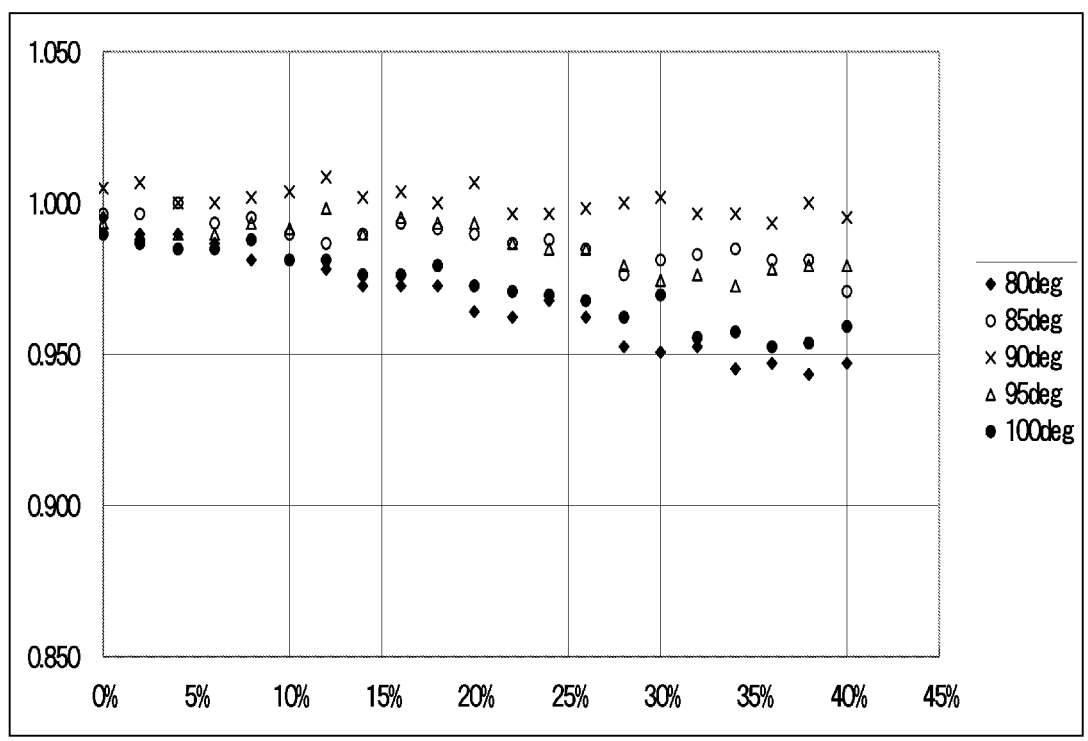
FIG. 8 illustrates a brightness change of the lens sheet of the first embodiment.

FIG. 8 illustrates front brightness. A y-axis indicates a relative value while the 90-degree prism sheet is set to 1.0. As can be seen from FIG. 8, the brightness is largely reduced as the ratio of the width L of the apex portion 3a of the first lens array 3 and the pitch between the unit lenses is increased.

Accordingly, desirably the ratio of the width L of the apex portion 3a of the first lens array 3 and the pitch between the unit lenses is decreased as much as possible. When both the front brightness and the maximum inclination ratio α are optimized, desirably the apex angle θ2 of the second lens array 5 ranges from 80 degrees to 90 degrees, and more desirably the apex angle θ2 is 85 degrees.

Figure 9:
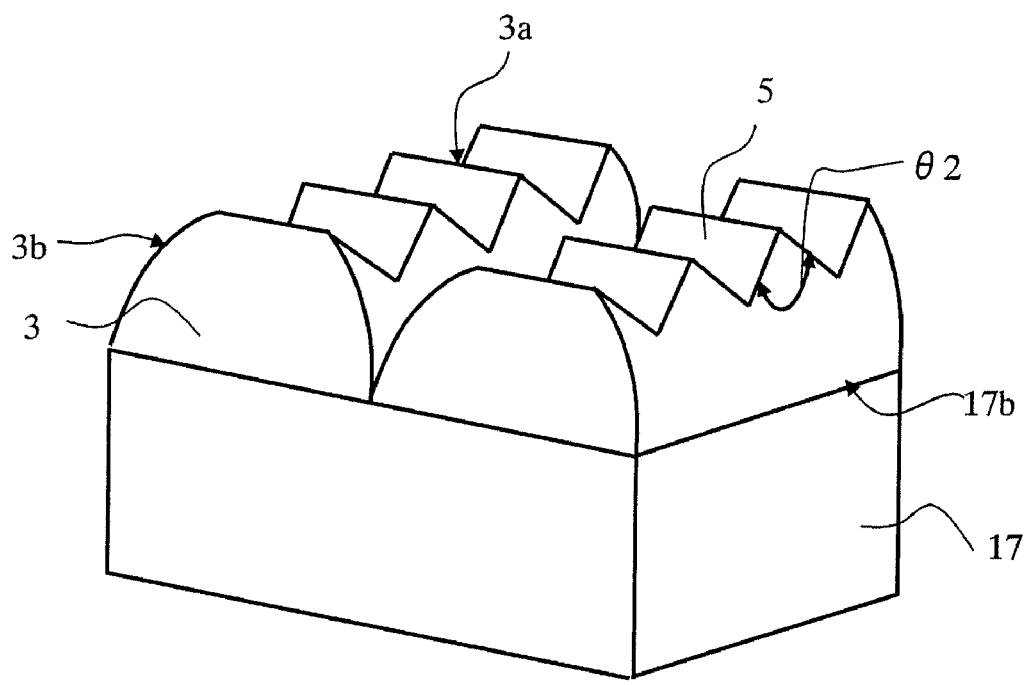
FIG. 9A is a perspective view illustrating the lens sheet of the first embodiment.
FIG. 9B is a perspective view illustrating the lens sheet of the first embodiment.
Figure 9:
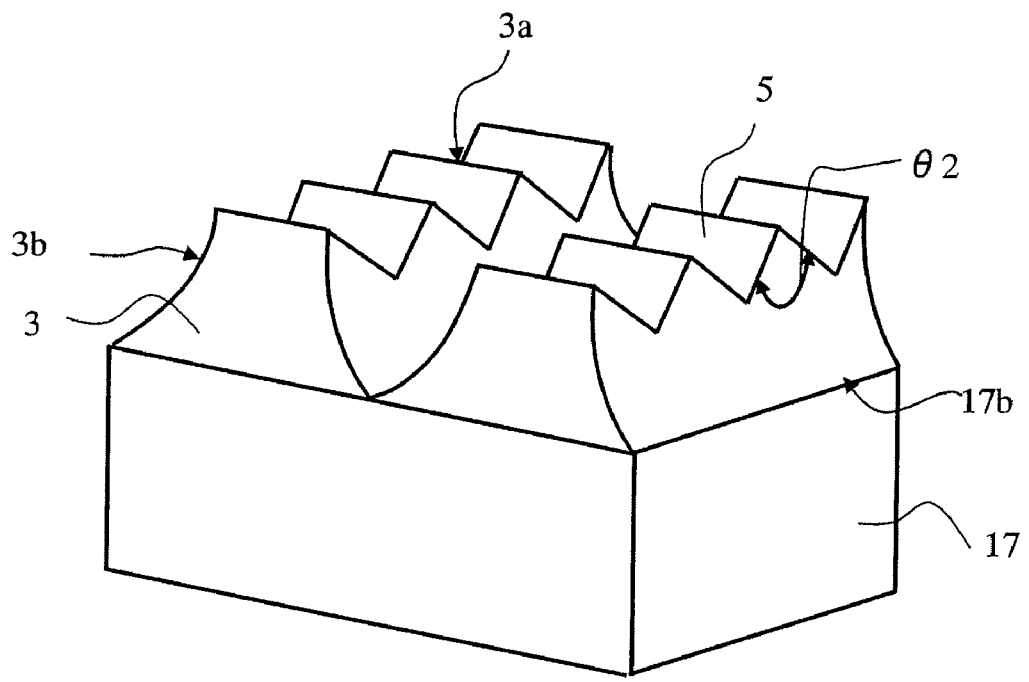

As illustrated in FIG. 9, the first lens array 3 can be formed into a curved lens shape in order to adjust the maximum inclination ratio α. FIG. 9A illustrates the case of a curved convex lens, and FIG. 9B illustrates the case of a curved concave lens. When the first lens array 3 is formed into the curved shape, the outgoing direction of the lens sheet 1 becomes broad to be able to decrease the maximum inclination ratio.

Figure 10:
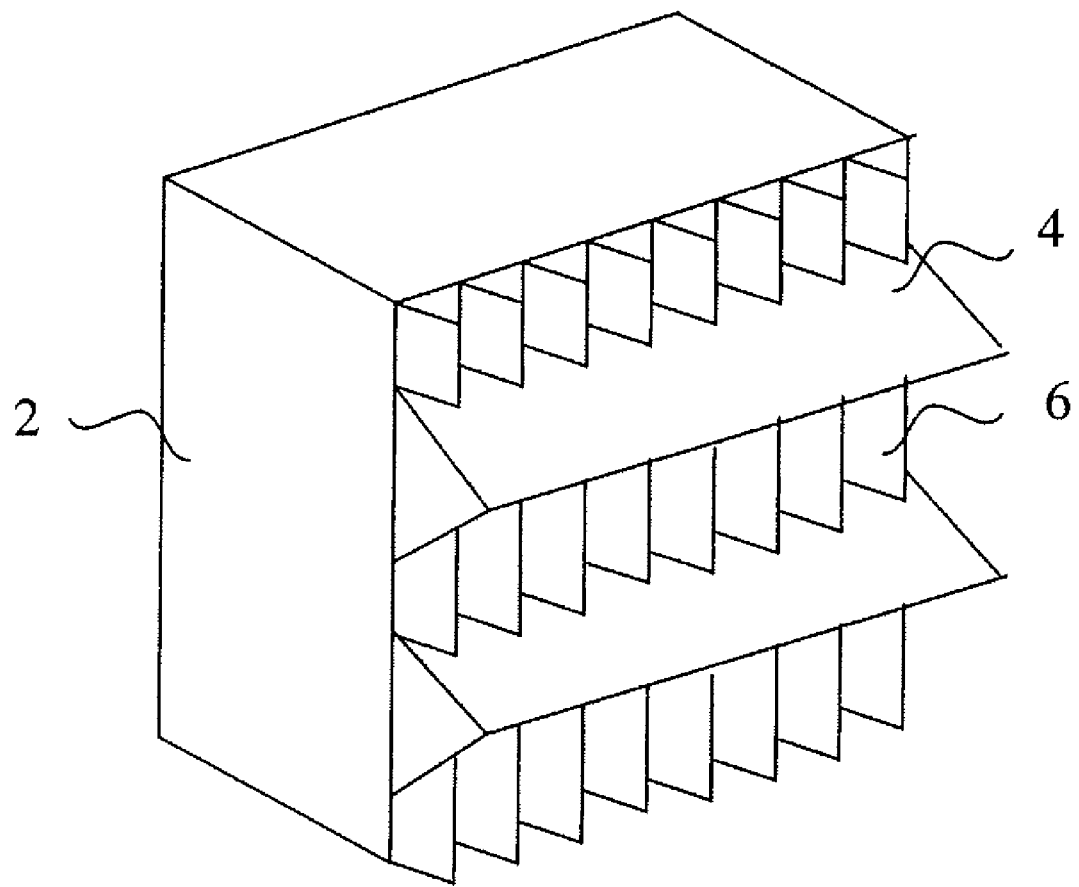
FIG. 10 illustrates a mold of the lens sheet of the first embodiment.

As to a method for producing the lens sheet 1 of the first embodiment, a metallic mold of FIG. 10 is prepared to produce a lens sheet 2, and a reverse plate of the metallic mold is formed and used as the mold, which allows the lens sheet 1 to be produced. The first lens array 3 is formed by a first lens array mold portion 4 of FIG. 10, and the second lens array 5 is formed by a second lens array mold portion 6 of FIG. 5. Alternatively, the second lens array 5 may be formed after the first lens array 3 is formed on the light transmissive base material 17.

Figure 11:
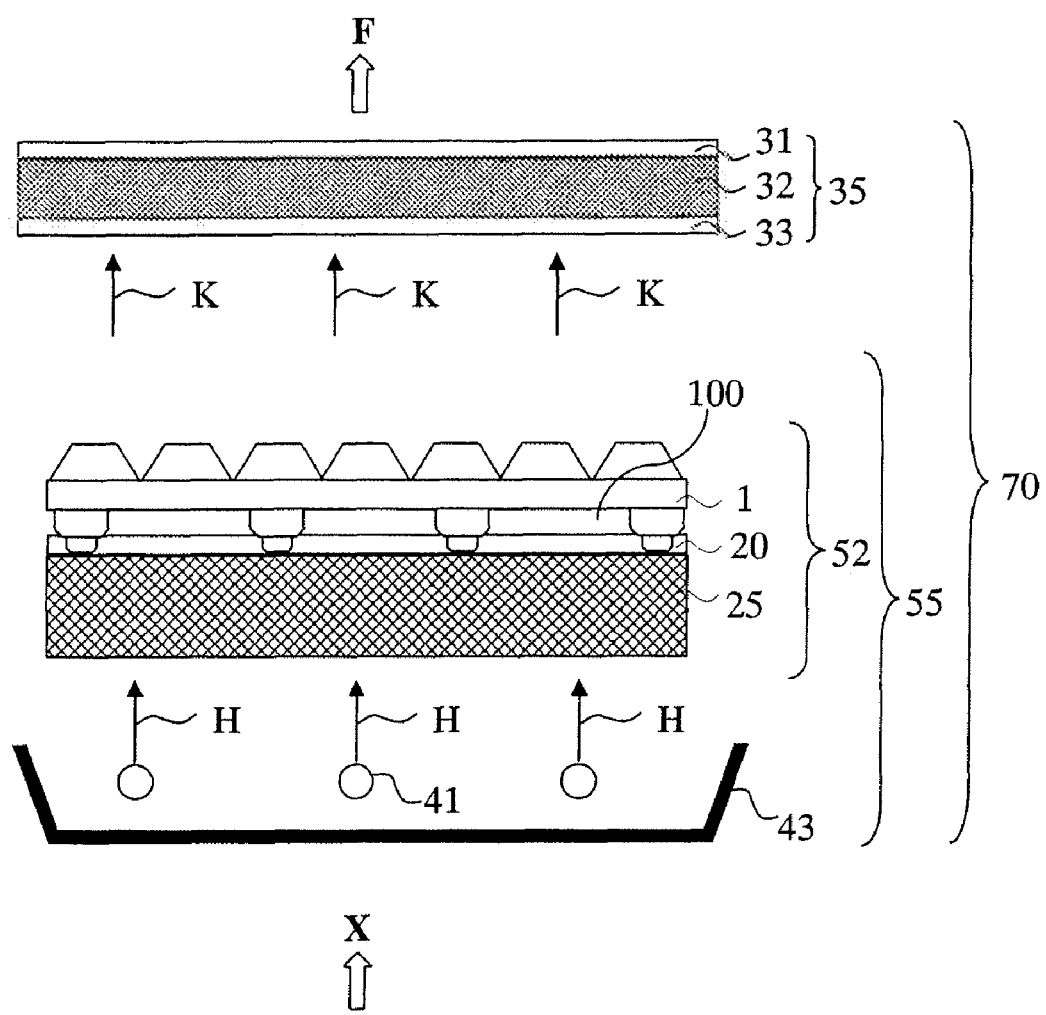
FIG. 11 is a sectional view schematically illustrating a display apparatus according to a second embodiment of the invention.

FIG. 11 is a sectional view schematically illustrating an optical sheet 52, a backlight unit 55, and a display apparatus 70 according to a second embodiment of the invention.

The display apparatus 70 of the second embodiment differs from the display apparatus 70 of the first embodiment in the following points. That is, protrusions 29 are formed on a surface opposite the observer side F of the lens sheet 1, and the optical sheet 52 is disposed so as to be joined to the diffuser plate 25 with a fixed layer 20 interposed therebetween.

Figure 12:
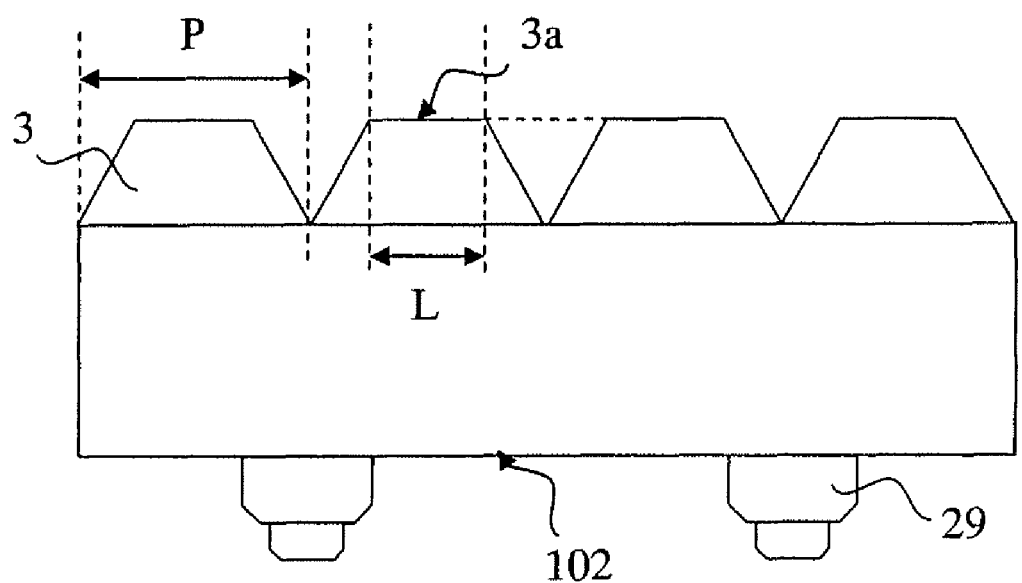
FIG. 12 illustrates a lens sheet constituting an optical sheet of the second embodiment.
Figure 13:
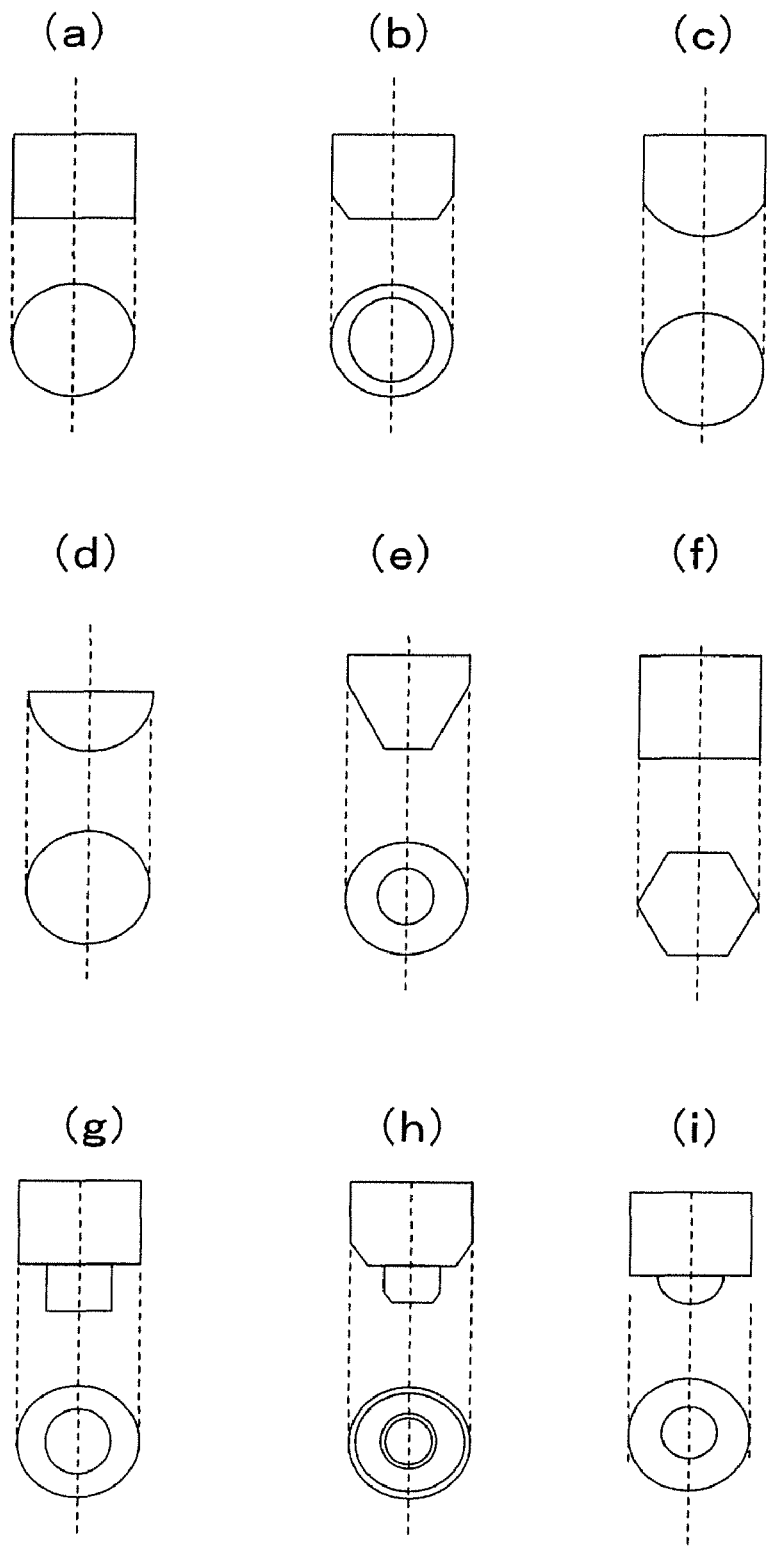
FIG. 13A illustrates an example of a protrusion shape in the second embodiment.
FIG. 13B illustrates an example of the protrusion shape in the second embodiment.
FIG. 13C illustrates an example of the protrusion shape in the second embodiment.
FIG. 13D illustrates an example of the protrusion shape in the second embodiment.
FIG. 13E illustrates an example of the protrusion shape in the second embodiment.
FIG. 13F illustrates an example of the protrusion shape in the second embodiment.
FIG. 13G illustrates an example of the protrusion shape in the second embodiment.
FIG. 13H illustrates an example of the protrusion shape in the second embodiment.
FIG. 13I illustrates an example of the protrusion shape in the second embodiment.
Figure 14:
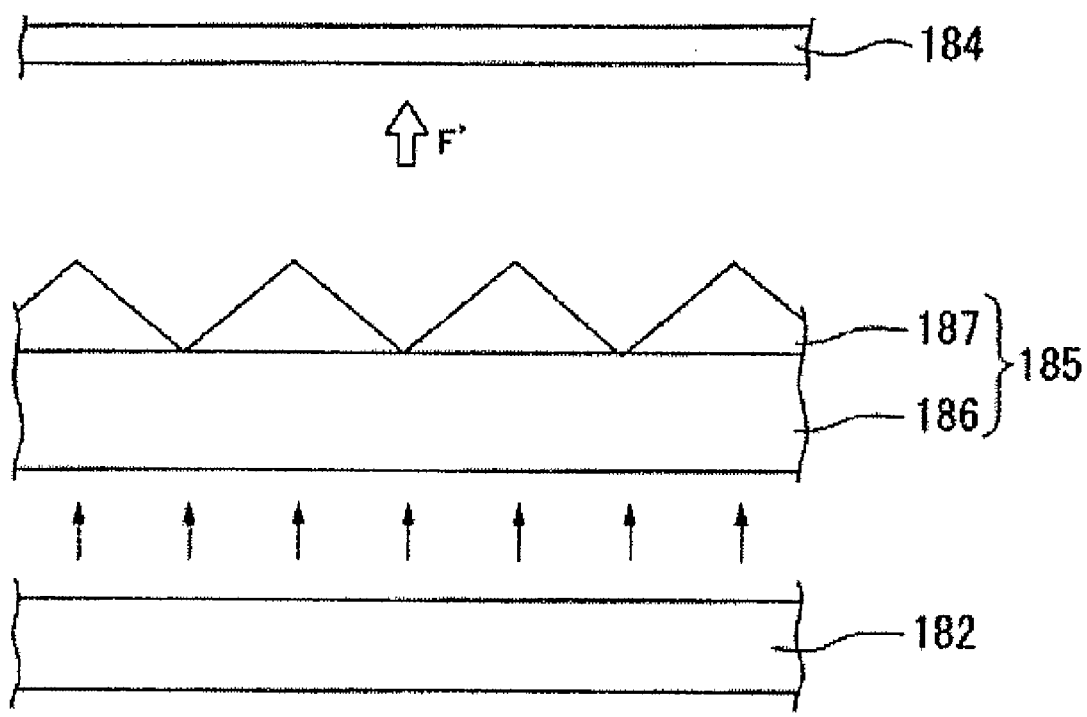
FIG. 14 is a sectional view schematically illustrating an example of disposition of a BEF.
Figure 15:
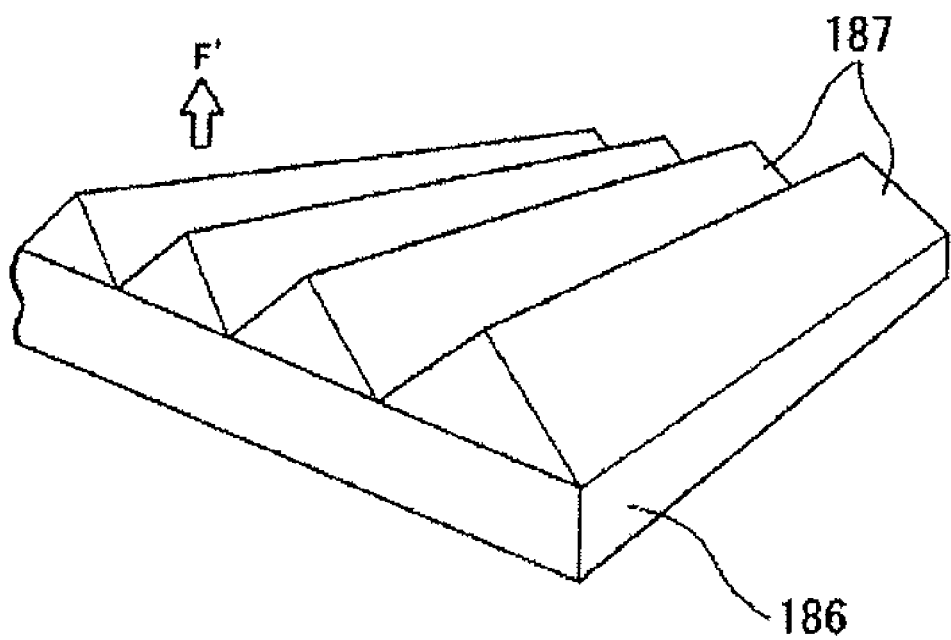
FIG. 15 is a perspective view of the BEF.
Figure 16:
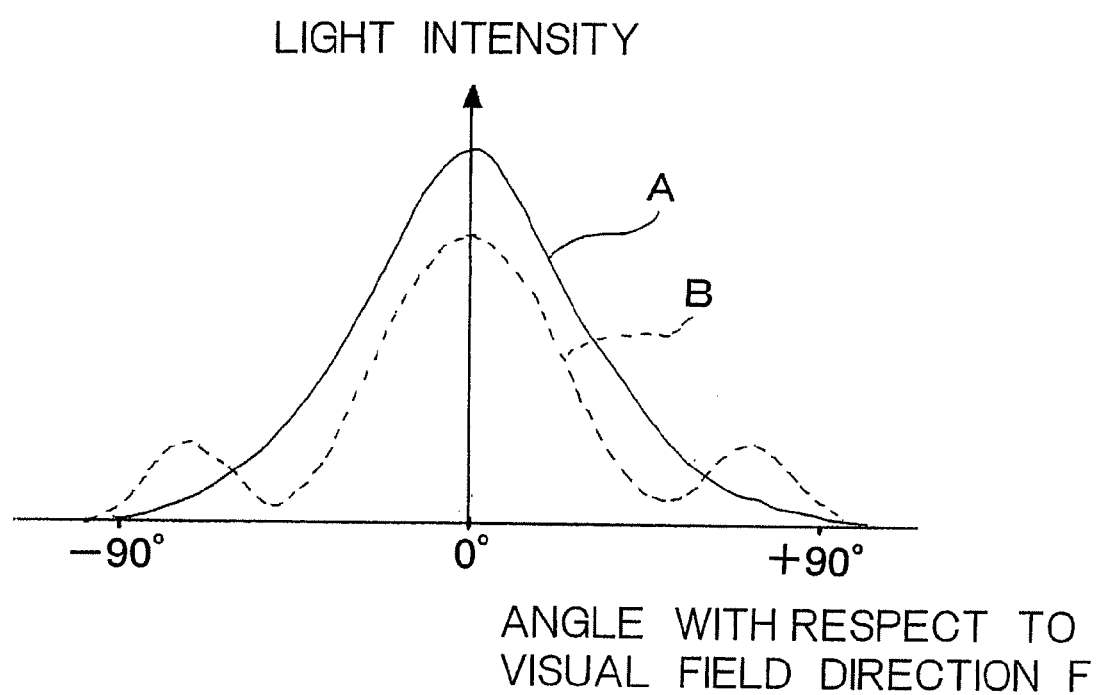
FIG. 16 is a graph illustrating a relationship between light intensity and an angle with respect to a visual field direction.

As illustrated in FIG. 12, a substantially flat plane surface portion 102 and the protrusions 29 including one or plural cylinders are provided on the incident surface side of the lens sheet 1. The protrusion 29 is formed into the cylindrical shape having a central axis extended in a direction parallel to the thickness direction of the lens sheet 1. The protrusion 29 is not limited to the cylinder of FIG. 13A, but may be formed into a shape in which a leading end of the cylinder is tapered as illustrated in FIG. 13B, a shape in which the leading end of the cylinder is rounded as illustrated in FIG. 13C, a macro lens shape of FIG. 13D, a shape in which the leading end of the cylinder is tapered in a trapezoidal manner as illustrated in FIG. 13E, a polygonal shape of FIG. 13F, a shape in which the cylinder is formed in two steps as illustrated in FIG. 13G, a shape in which the cylinder is formed in two steps while the leading end of the cylinder is tapered as illustrated in FIG. 13H, and a shape in which the cylinder and the macro lens are combined as illustrated in FIG. 13I. Among others, more desirably the protrusion 29 is formed into a shape in which a sectional area thereof is decreased as the protrusion 29 is away from the plane surface portion 102. In forming the protrusion 29, productivity is improved because a diluting property and a peeling off property from the metallic mold are improved.

More desirably the protrusion 29 is formed by at least two cylinders. In such cases, desirably the cylinders from the second step are integrated so as to be buried in the fixed layer 20 when the diffuser plate 25 and the fixed layer 20 are laminated. The peeling strength is improved by increasing the joining area (area in which the fixed layer 20 and the protrusion 29 are joined).

As described above, the protrusion 29 having the good diluting property, metallic mold peeling property, and adhesion to the fixed layer 20 is formed on the incident surface of the lens sheet 1, so that the optical sheet 52 in which the brightness is not reduced can be provided even if the fixed layer 20 has a surface smoothing property or contains light diffusion particles.

The fixed layer 20 is formed using an adhesive agent and a bonding agent. For example, urethane resin, acrylic resin, rubber resin, silicone resin, and vinyl resin can be used as the adhesive agent and the bonding agent. The one-component type adhesive agent and bonding agent can be used to bond the fixed layer 20 by pressing, or by curing with heat or light. The two-component type adhesive agent and bonding agent or the adhesive agent and bonding agent cured by mixing plural liquids can be used to bond the fixed layer 20.

Fillers may be dispersed in the fixed layer 20. An elastic modulus of the joining layer can be increased by dispersing the fillers in the fixed layer 20.

Examples of the method for forming the fixed layer 20 include a method for directly applying the fixed layer 20 to the joining surface and a method for bonding a previously-prepared dry film. When the fixed layer 20 is prepared as the dry film, preferably the dry film can simply be handled on the production process.

As illustrated in FIG. 1, the light emitted from the light source 41 propagates through the diffuser plate 25 and a gap (air layer) 100, and the light is incident to the incident surface 102 of the lens sheet 1, and light K having an optical gain of 1 or more is output from the surface opposite the incident surface 102.

As used herein, the optical gain means an index expressing a diffusing property of an optically diffusing member, and the optical gain is expressed by a ratio of the brightness of the light and the brightness of a perfect diffusing material. It is assumed that the perfect diffusing material has the brightness of 1. When the diffusing property of the measured diffusing member depends on the direction, the diffusing property of the diffusing member can be expressed by obtaining the optical gain in each direction.

The perfect diffusion means an ideal diffusing material in which the absorption becomes zero and constant intensity is exhibited in any direction. That is, the optical gain of 1 or more means that the measured diffusing member has the light collecting effect in the measured direction, and the light collecting effect is enhanced as the optical gain is increased.

The diffuser plate 25 is formed by dispersing the light diffusion regions in a transparent resin.

For example, a thermoplastic resin and a thermosetting resin can be used as the transparent resin. Examples of the transparent resin include polycarbonate resin, acrylic resin, fluorine-acrylic resin, silicone-acrylic resin, epoxy-acrylate resin, polystyrene resin, cycloolefin polymer, methylstyrene resin, fluorene resin, polyethylene terephthalate (PET), polypropylene, acrylonitrile-styrene copolymer, and acrylonitrile-polystyrene copolymer.

Preferably the light diffusion region includes light diffusion particles. This is because the suitable diffusing ability can easily be obtained.

For example, transparent particles made of inorganic oxide or resin can be used as the light diffusion particles. Examples of the transparent particles made of inorganic oxide include silica and alumina. Examples of the transparent particles made of resin include acrylic particles, styrene particles, styrene acrylic particles and a cross-link thereof, particles made of melamine-formalin condensate, fluorine polymer particles such as PTFE (polytetrafluoroethylene), PFA (perfluoroalkoxy resin), FEP (tetrafluoroethylene hexafluoropropylene copolymer), PVDF (polyvinylidene fluoride), and ETFE (ethylene-tetrafluoroethylene copolymer), and silicone resin particles.

The transparent particles may be used by combining at least two kinds of the transparent particles. There are no particular limitation to the sizes and shapes of the transparent particles.

When the light diffusion particles are used as the light diffusion region, preferably the diffuser plate 25 has a thickness of 0.1 to 5 mm.

When the diffuser plate 25 has the thickness of 0.1 to 5 mm, the optimum diffusing ability and brightness can be obtained. The diffusing ability is insufficient when the thickness of the diffuser plate 25 is smaller than 0.1 mm. When the thickness of the diffuser plate 25 is more than 5 mm, the brightness is lowered by the absorption due to excessive amount of resin.

When the thermoplastic resin is used as the transparent resin, air bubbles may be used as the light diffusion region.

The light is irregularly reflected at an inner surface of the bubble formed in the thermoplastic resin, thereby exerting light diffusing function that is the same as or more than that of the dispersion of the light diffusion particles. Therefore, the diffuser plate 25 can further be thinned.

White PET or white PP can be cited as an example of the diffuser plate 25. For the white PET, after the resin incompatible with PET or the filler such as titanium oxide ($TiO_2$), barium sulfate ($BaSO_4$), and calcium carbonate is dispersed in PET, PET is drawn by a biaxially drawing method to generate the bubble around the filler.

The diffuser plate 25 made of the thermoplastic resin may be drawn in at least uniaxial direction. This is because, when the diffuser plate 25 is drawn in at least uniaxial direction, the bubble can be generated around the filler.

Examples of the thermoplastic resin include polyester resins such as polyethylene terephthalate (PET), polyethylene-2,6-naphthalate, polypropylene terephthalate, polybutylene terephthalate, cyclohexane dimethanol copolymer polyester resin, isophthalate copolymer polyester resin, sporoglycol copolymer polyester resin, and fluorene copolymer polyester resin, polyolefin resins such as polyethylene, polypropylene, polymethylpentene, and alicyclic olefin copolymer resin, acrylic resins such as polymethylmethacrylate, polycarbonate, polystyrene, polyamide, polyether, polyester amide, polyether ester, polyvinylchloride, cycloolefin polymer, copolymers thereof, and mixtures thereof. There is no particular limitation to the thermoplastic resin.

When the bubbles are used as the light diffusion region, preferably the diffuser plate 25 has a thickness of 25 to 500 µm.

When the thickness of the diffuser plate 25 is smaller than 25 µm, stiffness of the sheet becomes insufficient to easily generate a wrinkle in the display on the production process. When the thickness of the diffuser plate 25 is more than 500 µm, although no particular problem is generated for the optical performance, the diffuser plate 25 is hardly formed in a roll shape because of the increased rigidity, and a slit is difficult to form. Accordingly, the diffuser plate 25 having the thickness more than 500 µm obtains little advantage when compared to the conventional diffuser plate.

The thickness of the lens sheet 1 is determined not by the influence on the optical properties, but by the production process or required physical property of the lens sheet 1.

For example, in forming the first lens array 3, the second lens array 5, and the protrusion 29 by UV molding, the undulating (waving) is generated when a base material thickness T of a support base material film is 50 µm or less. Therefore, it is necessary that the base material thickness T be more than 50 µm.

The base material thickness depends on the size of the backlight unit or the display apparatus. For example, desirably the base material thickness T ranges from 0.05 mm to 3 mm in the display apparatus having the size of 37 inches or more.

The protrusions 29 may be arrayed at constant intervals. However, in this case, the moire interference fringe is occasionally generated between the first lens array 3 and the second lens array 5. Accordingly, the first lens array 3 and the second lens array 5 are desirably formed such that the array directions of the first lens array 3 and second lens array 5 are not parallel to each other. Desirably a bias angle may be set in the range of 30 degrees or less.

The protrusions 29 are arrayed at constant intervals, and part of the protrusions 29 can randomly be removed to apparently establish random disposition. Alternatively, the protrusions 29 may randomly be arrayed. As a result, the moire interference fringe between the first lens array 3 and the second lens array 5 can be prevented.

Because the display often has a periodical pixel structure, a moire generated between periodical structures and high-order moires such as second-order moire generated in at least three periodical structures degrade the appearance of the display. Therefore, a lenticular direction of the lens sheet 1 may be deviated within the range of 30 degrees or less from the direction of the periodical structure of the image display element 35. This can prevent the moire generated between the horizontal or vertical periodical pixel structures of the image display element 35.

The moire can be prevented by snaking the first lens array 3 and the second lens array 5.

There is another method for randomizing the lens pitches of the first lens array 3 and second lens array 5 in order to prevent the moire. Examples of the randomizing method include a method for randomizing the height and pitch of the lens, a method for randomizing only the pitch while the height of the lens is not changed, and a method for randomizing a shift amount Δ of the prism lens. Desirably the method for randomizing the pitch while the height of the lens is not changed is adopted from the viewpoint of the unevenness of the appearance. In this case, desirably a random ratio (increase-decrease ratio of the pitch to the standard pitch) is 20% or less, and more desirably the random ratio is 10% or less.

The first lens array 3, the second lens array 5, and the protrusion 29 are molded on the light transmissive base material 17 using the UV setting resin or radiation curing resin, or formed by the well-known extrusion molding method, injection molding method, or hot press molding method using PET (polyethylene terephthalate), PC (polycarbonate), PMMA (polymethylmethacrylate), COP (cycoolefin polymer), PAN (polyacrylonitrile copolymer), and AS (acrylonitrile-styrene copolymer).

For example, a light reflection layer made of white pigment may be provided on the surface of the protrusion 29 of the lens sheet 1. Examples of the white pigment include titanium oxide, aluminum oxide, and barium sulfate. The light reflection layer made of the white pigment is formed by a printing method.

As illustrated in FIG. 1, the display apparatus 70 of the first and second embodiments includes the image display element 35 and the backlight unit 55.

The image display element 35 includes two polarizing plates (polarizing film) 31 and 33 and a liquid crystal panel 32 sandwiched therebetween. The liquid crystal panel 32 is formed while a gap between two glass substrates is filled with a liquid crystal layer.

The light K emitted from the backlight unit 55 is incident to the liquid crystal portion 32 through the polarization film 33, and is output onto the observer side F through the polarization film 31.

Preferably the image display element 35 is an element in which the light transmission/light blocking is performed with the pixel unit to display the image. When the light transmission/light blocking is performed with the pixel unit to display the image, the brightness onto the observer side F is enhanced by the optical sheet 52, the dependence of the light intensity on the view angle is reduced by the optical sheet 52, and the light in which the lamp image is reduced is effectively used to display the image with high quality.

Preferably the image display element 35 is a liquid crystal display element. The liquid crystal display element is a typical element in which the light transmission/light blocking is performed with the pixel unit to display the image. In the liquid crystal display element, compared with other display elements, the image quality can be improved while the production cost is reduced.

A diffusion film, a prism sheet, and a polarization separation reflecting sheet may be disposed in the display apparatus 70 of the first and second embodiments. As a result, the image quality can further be improved.

Because the light K whose light collecting and diffusing property is improved by the optical sheet 52 is utilized in the configuration of the display apparatus 70 of the second embodiment, the brightness on the observer side F is improved to smooth the light intensity distribution in the view angle direction, and the image in which the lamp image is reduced can be displayed on the image display element 35.

In the configuration of the display apparatus 70 of the second embodiment, the light K whose light collecting and diffusing property is improved by the backlight unit 55 is utilized by the image display element 35 that defines the display image according to the light transmission/light blocking of the pixel unit. Therefore, the brightness on the observer side F is improved to smooth the light intensity distribution in the view angle direction, and the image in which the lamp image is reduced can be obtained.

In the configuration of the display apparatus 70 of the second embodiment, the image display element 35 is the liquid crystal display element, and the light K whose light collecting and diffusing property is improved by the backlight unit 55 is utilized. Therefore, the brightness on the observer side F is improved to smooth the light intensity distribution in the view angle direction, and the image in which the lamp image is reduced can be obtained.

As described above, the lens sheet 1 of the embodiments and the optical sheet 52 provided with the lens sheet 1 are used in the liquid crystal apparatus. However, the lens sheet 1 of the embodiments and the optical sheet 52 provided with the lens sheet 1 may be used in various apparatuses, such as a rear-projection screen, a solar cell, an organic or inorganic EL, and a lighting apparatus, which control the optical path.

Consequently, the aspects of the invention can provide the lens sheet that enhances the brightness on the observer side by collecting the diffusion light output from the diffuser plate with the bidirectional lens while the side lobe is hardly generated, the optical sheet that decreases the number of components by integrating the lens sheet and the diffuser plate while undulating (waving) and a deflection of the lens sheet are prevented, and the backlight unit and display apparatus, which are provided with the lens sheet and the optical sheet.

Examples of the invention will be described in detail. However, the invention is not limited to these Examples.

EXAMPLES

Example 1

The lens sheet 1 made of polycarbonate was prepared by the extrusion molding method using the base material 17 having the thickness of 250 μm. The first lens array 3 was formed into the trapezoidal prism having the apex angle of 90 degrees, the lens pitch of 100 μm, and the width L of 20 μm in the apex portion 3a. The second lens array 5 was formed into the triangular prism having the apex angle of 90 degrees and the lens pitch of 25 μm. The angle formed between the first lens array 3 and the second lens array 5 was set to 90 degrees.

Example 2

The lens sheet 1 made of polycarbonate was prepared by the extrusion molding method using the base material 17 having the thickness of 250 μm. The first lens array 3 was formed into the trapezoidal prism having the apex angle of 85 degrees, the lens pitch of 100 μm, and the width L of 50 μm in the apex portion 3a. The second lens array 5 was formed into the triangular prism having the apex angle of 90 degrees and the lens pitch of 25 μm. The angle formed between the first lens array 3 and the second lens array 5 was set to 90 degrees.

Example 3

The lens sheet 1 made of polycarbonate was prepared by the extrusion molding method using the base material 17 having the thickness of 250 μm. The first lens array 3 was formed into the trapezoidal prism having the apex angle of 85 degrees, the lens pitch of 100 μm, and the width L of 50 μm in the apex portion 3a. The second lens array 5 was formed into the triangular prism having the apex angle of 90 degrees and the lens pitch of 34.5 μm. The angle formed between the first lens array 3 and the second lens array 5 was set to 75 degrees.

Comparative Example 1

The lens sheet 1 made of polycarbonate was prepared by the extrusion molding method using the base material 17 having the thickness of 250 μm. The lens sheet 1 was formed into the triangular prism shape having the apex angle of 90 degrees and the width L of 50 μm.

Figure 17:
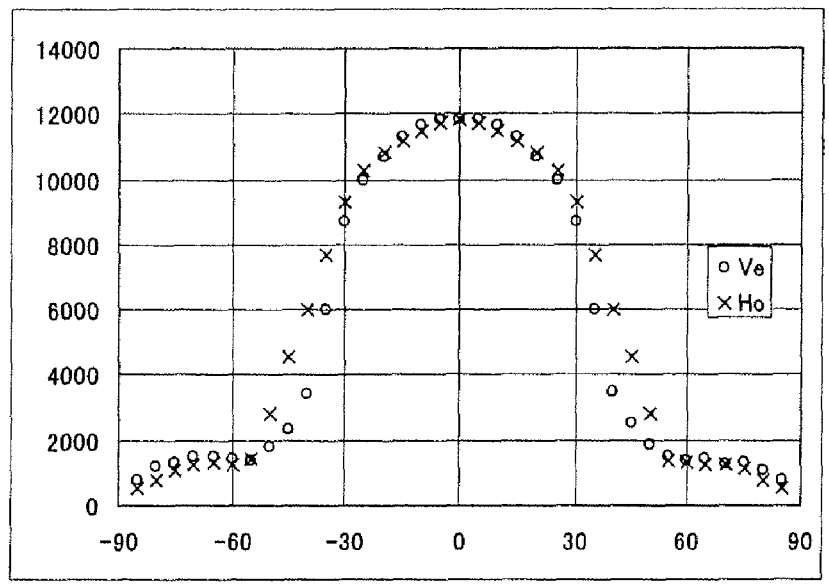
FIGS. 17A and 17B illustrate light distribution properties of Example 1 and Comparative Example 1.
Figure 17:
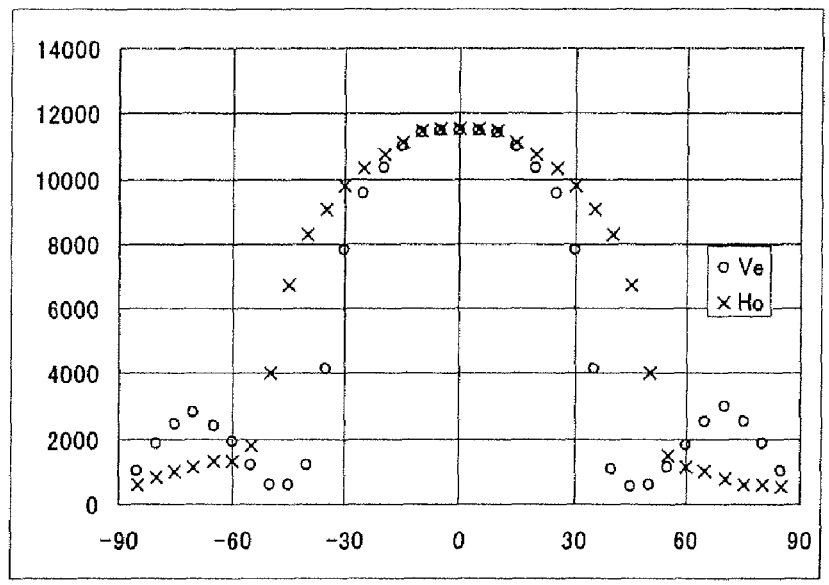

The lens sheet 1 prepared in Example 1 and the lens sheet prepared in Comparative Example 1 were disposed on the backlight unit 55 to measure the light distribution. In the configuration of the backlight 55, the CCFL 41 was disposed on the observer side F of the reflection plate 43, and the diffuser plate 25 and the lens sheet 1 were disposed on the CCFL 41 (observer side F). The lens sheet 1 of Example 1 was disposed while the array direction of the first lens array 3 was set to the direction Ve. FIG. 17 illustrates the measurement result.

As illustrated in FIG. 17A, in the lens sheet 1 of Example 1, the side lobe is not generated, and the brightness in the front direction (on the observer side F) is increased compared with Comparative Example 1 of FIG. 17B.

Then the lens sheets 1 prepared in Examples 1 to 3 and the lens sheet prepared in Comparative Example 1 were disposed on the backlight 55 to measure the front brightness and the maximum inclination ratio. In the configuration of the backlight 55, the CCFL 41 was disposed on the observer side F of the reflection plate 43, and the diffuser plate 25 and the lens sheet 1 were disposed on the CCFL 41 (observer side F). The lens sheet 1 of Example 1 was disposed while the array direction of the first lens array 3 was set to the direction Ve. The lens sheet 1 of Example 2 was disposed while the array direction of the first lens array 3 was set to the direction Ho. In the lens sheet 1 of Example 3, the sheet in which the array direction of the first lens array 3 was set to the direction Ho and the sheet in which the array direction of the first lens array 3 was set to the direction Ve were laminated. Table 1 illustrates the measurement result.

TABLE 1

|  | front brightness [cd/m$^2$] | maximum inclination ratio Ve | maximum inclination ratio Ho |
|---|---|---|---|
| Example 1 | 11250 | 5.6% | 3.9% |
| Example 2 | 11310 | 5.3% | 3.7% |
| Example 3 | 14700 | 3.4% | 3.1% |
| Comparative Example 1 | 11500 | 7.3% | 5.4% |

As illustrated in Table 1, there is little difference in front brightness between Examples 1 and 2 and Comparative Example 1, and Examples 1 and 2 are better than Comparative Example 1 in the maximum inclination ratio. In Example 3, the front brightness is extremely high, and the moire is not generated even if the two sheets are laminated.

Example 4

The two-step cylindrical protrusion was formed on the back surface of the lens sheet 1 prepared in Example 1, a diameter of the first step cylinder closer to the plane surface portion 102 was set to 40 μm, the height of the first step cylinder was set to 30 μm, a diameter of the second step cylinder was set to 20 μm, and a height of the second step cylinder was set to 15 μm. The protrusions were arrayed at intervals of 200 μm. The angle formed between the array direction of the first lens array 3 and the array direction of the protrusion 29 was set to 15 degrees.

The prepared lens sheet 1 and a commercially available PC-resin diffuser plate were integrally laminated using an adhesive agent, and disposed such that the angle formed between the pixel of the liquid crystal TV and the first lens array 3 was set to 15 degrees. As a result, in the liquid crystal TV, the peel-off was not generated by the heat of the backlight, and the moire was not generated.

The invention claimed is:

1. A lens sheet, wherein a trapezoidal prism array that is a first lens array is disposed on one surface of a light transmissive base material with an apex angle of the trapezoidal prism array that ranges from 70 degrees to 110 degrees, a triangular prism array that is a second lens array is disposed within an intersection angle range of 70 degrees to 110 degrees in an apex portion of the trapezoidal prism array with an apex angle of the triangular prism array that ranges from 70 degrees to 110 degrees, a lens height of the triangular prism array is lower than a lens height of the trapezoidal prism array, and the apex portion of the trapezoidal prism array is flush with an apex portion of the triangular prism array.

2. The lens sheet according to claim 1, wherein a ratio of a pitch P of the trapezoidal prism array and a pitch Q of the triangular prism array satisfies Formula 1:

$$0.05 \leq Q/P \leq 2.0 \quad \text{[Formula 1]}$$

3. The lens sheet according to claim 1, wherein the apex angle θ1 of the trapezoidal prism array and the apex angle θ2 of the triangular prism array satisfy a relationship of Formula 2:

$$\theta 1 \leq \theta 2 \quad \text{[Formula 2]}$$

where a vertical direction is the direction in which the trapezoidal prism array is extended and a horizontal direction is the direction in which the trapezoidal prism array is arrayed.

4. The lens sheet according to claim 1, wherein the apex angle θ1 of the trapezoidal prism array and the apex angle θ2 of the triangular prism array satisfy a relationship of Formula 3:

$$\theta 1 \geq \theta 2 \quad \text{[Formula 3]}$$

where a horizontal direction is the direction in which the trapezoidal prism array is extended and a vertical direction is the direction in which the trapezoidal prism array is arrayed.

5. The lens sheet according to claim 1, wherein a ratio of a width L of the apex portion of the trapezoidal prism array and a pitch P of the trapezoidal prism array satisfies a relationship of Formula 4:

$$L/P \geq 40\% \quad \text{[Formula 4]}$$

where a vertical direction is the direction in which the trapezoidal prism array is extended and a horizontal direction is the direction in which the trapezoidal prism array is arrayed.

6. The lens sheet according to claim 1, wherein a ratio of a width L of the apex portion of the trapezoidal prism array and a pitch P of the trapezoidal prism array satisfies a relationship of Formula 5:

$$L/P \leq 40\% \quad \text{[Formula 5]}$$

where a horizontal direction is the direction in which the trapezoidal prism array is extended and a vertical direction is the direction in which the trapezoidal prism array is arrayed.

7. A display backlight unit comprising:

an image display element that defines a display image;

a light source;

a diffuser plate to which light emitted from the light source is incident, and which decreases light quantity unevenness by diffusing the incident light and outputs the diffused light; and the lens sheet according to claim 1, wherein the light source, the diffuser plate and the lens sheet are provided on a back surface of the image display element.

8. A display apparatus comprising:

the display backlight unit according to claim 7 that is provided on a back surface of the image display element, the image display element defines the display image according to light transmission/light blocking in a pixel unit.

* * * * *